United States Patent
Taguchi et al.

(10) Patent No.: US 9,862,167 B2
(45) Date of Patent: Jan. 9, 2018

(54) LAMINATE INCLUDING ANTIREFLECTIVE MOTH-EYE FILM AND PROTECTION FILM

(71) Applicants: Sharp Kabushiki Kaisha, Osaka-shi, Osaka (JP); Lintec Corporation, Itabashi-ku, Tokyo (JP)

(72) Inventors: Tokio Taguchi, Osaka (JP); Atsushi Kurokawa, Tokyo (JP); Takayuki Arai, Tokyo (JP); Satoru Shoshi, Tokyo (JP)

(73) Assignees: SHARP KABUSHIKI KAISHA, Osaka (JP); LINTEC CORPORATION, Tokyo (JP)

( * ) Notice: Subject to any disclaimer, the term of this patent is extended or adjusted under 35 U.S.C. 154(b) by 776 days.

(21) Appl. No.: 14/361,881

(22) PCT Filed: Nov. 30, 2012

(86) PCT No.: PCT/JP2012/081188
§ 371 (c)(1),
(2) Date: May 30, 2014

(87) PCT Pub. No.: WO2013/081145
PCT Pub. Date: Jun. 6, 2013

(65) Prior Publication Data
US 2014/0342121 A1    Nov. 20, 2014

(30) Foreign Application Priority Data
Dec. 2, 2011  (JP) .................. 2011-264620

(51) Int. Cl.
B32B 7/12 (2006.01)
B32B 27/30 (2006.01)
(Continued)

(52) U.S. Cl.
CPC .............. B32B 7/12 (2013.01); B32B 3/30 (2013.01); B32B 27/16 (2013.01); B32B 27/30 (2013.01);
(Continued)

(58) Field of Classification Search
CPC .... C09J 7/0217; C09J 133/08; C09J 133/066; C09J 2203/318; C09G 18/792;
(Continued)

(56) References Cited

U.S. PATENT DOCUMENTS

2007/0159698 A1* 7/2007 Taguchi ................ G02B 1/118
359/586
2009/0211912 A1    8/2009 Taguchi et al.
(Continued)

FOREIGN PATENT DOCUMENTS

JP     2009-057394 A    3/2009
JP     4368384 B2       11/2009
(Continued)

OTHER PUBLICATIONS

Translation to English for JP 2011-074380 A. accessed Jan. 25, 2017.*
(Continued)

*Primary Examiner* — Nancy R Johnson
(74) *Attorney, Agent, or Firm* — Harness, Dickey & Pierce, P.L.C.

(57) ABSTRACT

A laminated body includes: an antireflection film; and a protection film bonded onto the antireflection film. The adhesive layer is a layer with a material formed by cross-linking, with a cross-linking agent (B), and a (meth)acrylic acid ester copolymer. The (meth)acrylic acid ester copolymer (A) is a copolymer formed by polymerizing monomer components including, in relation to the total amount of the monomer components set at 100% by mass, 70 to 98% by (Continued)

mass of a (meth)acrylic acid alkyl ester monomer (a) including a noncyclic alkyl group containing 4 to 9 carbon atoms, 1.5 to 25% by mass of a (meth)acrylic acid ester monomer (b) containing an aliphatic ring, and 0.5 to 5% by mass of a (meth)acrylic-based monomer (c) containing a functional group exhibiting reactivity with the cross-linking agent (B). The area proportion of the components each having a molecular weight of 100,000 or less, is less than 3.0%.

19 Claims, 10 Drawing Sheets

(51) Int. Cl.
    *B32B 3/30*     (2006.01)
    *C09J 133/08*     (2006.01)
    *G02B 1/14*     (2015.01)
    *B32B 27/16*     (2006.01)
    *G02B 1/10*     (2015.01)
    *G02B 1/118*     (2015.01)
    *C09J 133/06*     (2006.01)
    *C08G 18/62*     (2006.01)
    *C08G 18/79*     (2006.01)
    *C09J 7/02*     (2006.01)

(52) U.S. Cl.
    CPC ....... *C08G 18/6229* (2013.01); *C08G 18/792* (2013.01); *C09J 7/0217* (2013.01); *C09J 133/066* (2013.01); *C09J 133/08* (2013.01); *G02B 1/105* (2013.01); *G02B 1/118* (2013.01); *G02B 1/14* (2015.01); *B32B 2307/40* (2013.01); *B32B 2551/00* (2013.01); *C09J 2203/318* (2013.01); *Y10T 428/24355* (2015.01)

(58) Field of Classification Search
    CPC ........ C09G 18/6229; Y10T 428/24355; B32B 7/12; B32B 3/30; B32B 27/30; B32B 27/16; B32B 2307/40; B32B 2551/00
    See application file for complete search history.

(56) References Cited

U.S. PATENT DOCUMENTS

| 2009/0252825 A1 | 10/2009 | Taguchi et al. |
| 2011/0033662 A1 | 2/2011 | Ikishima et al. |
| 2013/0011611 A1 | 1/2013 | Taguchi et al. |
| 2013/0057958 A1 | 3/2013 | Minoura et al. |
| 2013/0242398 A1 | 9/2013 | Taguchi et al. |

FOREIGN PATENT DOCUMENTS

| JP | 4368415 B2 | 11/2009 |
| JP | 2010-077168 A | 4/2010 |
| JP | 2010-107858 A | 5/2010 |
| JP | 2010-120348 A | 6/2010 |
| JP | 2010-214853 A | 9/2010 |
| JP | 2011-006524 A | 1/2011 |
| JP | 2011-013496 A | 1/2011 |
| JP | 2011-033869 A | 2/2011 |
| JP | 2011-042779 A | 3/2011 |
| JP | 2011-074380 A | 4/2011 |
| JP | 2011-088356 A | 5/2011 |
| WO | WO-2011118367 A1 | 9/2011 |
| WO | WO-2011/148721 A1 | 12/2011 |

OTHER PUBLICATIONS

Japanese Patent Office International Search Report dated Dec. 13, 2012.

* cited by examiner

Refractive index

LAMINATE INCLUDING ANTIREFLECTIVE MOTH-EYE FILM AND PROTECTION FILM

TECHNICAL FIELD

The present invention relates to a laminated body. More specifically, the present invention relates to a laminated body including a moth-eye film capable of reducing surface reflection by being bonded to a base material and a protection film suitable for protecting the surface of the moth-eye film.

BACKGROUND ART

Recently, attention has been paid to moth-eye structure capable of achieving super antireflection effect without using a conventional optical interference film, as a technique to reduce the surface reflection of display devices. The moth-eye structure allows the refractive index variation in the boundary between the external environment (air) and the surface of an article to be quasi-continuous by arranging, on the surface of the article to be subjected to an antireflection treatment, an asperity pattern further finer than the asperity pattern formed in an anti-glare (AG) film, having the asperity spacing equal to or less than the visible light wavelength without spaces between the asperities; thus, light is almost completely allowed to pass through the refractive index interface without being affected by the refractive index interface, and thus, the optical reflection on the surface of the article can be made to almost disappear (see, for example, Patent Literature 1 and Patent Literature 2).

Such a moth-eye structure allows light to pass through the interface with the air by quasi-elimination of the refractive index variation of the interface with the air and hence is generally used as bonded to the outermost surface of an article. However, there is an adverse possibility that when the moth-eye structure is exposed to the outside, the antireflection property of the moth-eye structure is degraded due to external factors such as dirt or flaws during the production process and the distribution process of the article.

On the other hand, for the purpose of preventing dirt deposition and occurrence of flaws in the production processes of various members and/or in the shipping and transportation processes of various members, protection films or protection sheets in each of which an adhesive agent layer is laminated on the base material made of a synthetic resin have been widely used. Among such films and sheets, films or sheets to protect the members for outdoor applications are in particular required to have antiweatherability and light resistance. Protection films or protection sheets have to be peeled off after completion of their role, are required to strongly adhere to adherends while being required, and on the other hand, are required to be easily peeled off when used.

When a laminated body constituted with the moth-eye structure and a protection film is formed by applying the protection film to the moth-eye structure, the degradation of the antireflection property of the moth-eye structure due to external factors can be effectively prevented until the time of use, and the antireflection property of the moth-eye structure can be expected to be sufficiently displayed by peeling the protection film when necessary. In an optical member such as a film including a moth-eye structure, a laminated body in which the protection film is bonded is disposed in a high temperature atmosphere or subjected to a cleaning process, and hence the protection film is required to have higher adhesiveness and at the same time, to be able to be peeled off without partially leaving the adhesive layer on the adherend (repeelability) when peeled off.

Various investigation have been made on laminated bodies constituted with an asperity structure of a level of the order of micrometers and a protection film, wherein the asperity structure is not so fine as the asperities in the moth-eye structure of a level of the order of nanometers.

For example, Patent Literature 3 has proposed an adhesive sheet for use in repeeling having an adhesive layer in which the loss tangent of the dynamic viscoelasticity spectrum with a frequency of 1 Hz and at −50° C. to 150° C. exhibits a predetermined characteristic. Patent Literature 4 has proposed a surface protection sheet constituted with an adhesive layer including on a base material made of a polyolefin-based resin, through an intermediate layer, a styrene-isobutylene-styrene block copolymer, a styrene-isobutylene block copolymer and a tackifier. Patent Literature 5 has proposed the use of an adhesive layer formed of an adhesive including a rubber-based polymer.

Patent Literature 6 has proposed a surface protection film having an adhesive layer constituted with a rubber-based resin component, on a polyolefin base material having a predetermined bending stress coefficient. Patent Literature 7 has proposed a protect film in which on a base material constituted with a polyolefin-based resin, an adhesive layer constituted with a rubber-based resin obtained with isoprene as a base or an acrylic-based resin is laminated.

Patent Literature 8 has proposed an adhesive tape in which a fine asperity removal layer, a roughness development layer, a base material layer, a first adhesive layer having a high modulus of elasticity and a second adhesive layer having a low modulus of elasticity are laminated in the stated order.

On the other hand, recently, investigations have been started on the laminated bodies including a moth-eye structure including an asperity pattern of the order of nanometers and a protection film. For example, each of Patent Literature 9 and Patent Literature 10 has proposed a laminated body in which a non-asperity area is provided on the same surface as the surface on which a moth-eye structure is formed, and the non-asperity area ensures the adhesiveness to the protection film and the repeelability.

Patent Literature 11 has proposed the use, as a protection film to be bonded to an optical film having fine asperities of the order of nanometers, of a laminated body including an adhesive layer having a surface roughness Ra of 0.030 μm or less and a logarithmic damping factor rising temperature of −35° C. or higher in a rigid body pendulum measurement.

Moreover, Patent Literature 12 has proposed a laminated body in which a fixed film (protection film) is applied to a wire-grid polarizing plate having a fine asperity structure of the same order of the moth-eye structure. Specifically, Patent Literature 12 has proposed a laminated body including a wire-grid polarizing plate and a fixed film wherein the 90 degree peeling force after a heating at 80° C. for 24 hours is 0.03 to 0.50 N/25 mm and the decrement of the transmittance in the case of parallel nicols at 600 nm between before and after the peeling of the fixed film is 2% or less.

CITATION LIST

Patent Literature

Patent Literature 1: JP 4368384 B
Patent Literature 2: JP 4368415 B
Patent Literature 3: JP 2009-057394 A
Patent Literature 4: JP 2010-214853 A Patent Literature 5: JP 2011-013496 A
Patent Literature 6: JP 2010-077168 A
Patent Literature 7: JP 2011-006524 A
Patent Literature 8: JP 2011-042779 A
Patent Literature 9: JP 2010-107858 A
Patent Literature 10: JP 2010-120348 A
Patent Literature 11: JP 2011-088356 A
Patent Literature 12: JP 2011-033869 A

SUMMARY OF INVENTION

Technical Problem

The present inventors made various investigations on the laminated body including an antireflection film (hereinafter, also referred to as a moth-eye film) including on the surface thereof a plurality of protrusions formed with a spacing or a pitch size of the order of nanometers, and a protection film.

However, the laminated bodies using such protection films as proposed in Patent Literature 3 to Patent Literature 8 allow the compatibility between the adhesiveness and the repeelability to asperities of the order of microns, but do not allow a moth-eye film including an asperity structure equal to or less than the visible light wavelength to achieve a repeelability (adhesive-deposit preventing property) of the level that is required to maintain the performance of the moth-eye film.

Specifically, in such usage that the viewer visually recognizes the image of a display, it is necessary to use the laminated body under the condition that the protection film is peeled off. However, the following problems to be solved and the like have been found to be involved: when the conventional protection film is peeled off after a certain time elapsed from the bonding of the conventional protection film to the moth-eye film, the adhesive deposit (contamination) occurs in the gaps between the asperities of the moth-eye film to cause the clogging of the asperities, or the adhesiveness of the protection film to the fine asperity surface is insufficient and the protection film tends to be detached.

The present invention has been achieved in view of the existing circumstances as described above, and takes as its object the provision of a laminated body including an antireflection film onto the surface of which bonded is a protection film excellent in the temporary adhesiveness and hardly undergoing the occurrence of adhesive deposit after being peeled off.

Solution to Problem

The present inventors made a detailed investigation on the cause for the occurrence of the adhesive deposit on the surface of the moth-eye film. Consequently, the present inventors focused attention on the fact that even when the use of an adhesive agent for a common low reflection film including a flat surface (for example, a LR (low reflection) film, an AR (antireflection) film, an anti-glare (AG) film including on the surface thereof an asperity pattern of the order of microns, or the like) results in a satisfactory adhesiveness and no occurrence of the adhesive deposit, the use of such an adhesive agent for the moth-eye film including an asperity pattern of the order of nanometers sometimes results in the occurrence of failure.

A surface patterned with a fine asperity structure of the order of nanometers is larger in specific surface as compared to common flat and smooth surfaces, and hence a protection film satisfactory in adhesiveness to an asperity surface is made to very strongly adhere to such a patterned surface; thus, there is an adverse possibility that when the adhesive agent made to deeply penetrate into the asperity structure due to a cause such as an autoclave treatment is peeled, the adhesive agent present in the deep portions of the asperities is cut away from the rest of the adhesive agent to remain as contamination. The protrusions of the moth-eye film are of the fine structure of the order of nanometers, and hence there is an adverse possibility that even an adhesive deposit of the degree that does not matter conventionally causes a performance variation. Because of these phenomena, conventional repeelable adhesive agents cause contamination, and hence it is difficult to use the conventional repeelable adhesive agents; in particular, the occurrence of contamination is remarkable after autoclave treatment or a heat treatment.

Accordingly, the present inventors made a diligent investigation, and consequently have found that a laminated body including a protection film and a moth-eye film can be obtained in which the laminated body causes no adhesive deposit on the surface of the moth-eye film and has sufficient adhesiveness, by applying on the moth-eye film a protection film provided with an adhesive layer formed of an adhesive agent obtained by cross-linking, with a cross-linking agent, a copolymer mainly composed of a (meth)acrylic acid ester wherein the adhesive agent is prepared under the conditions that the weight-average molecular weight of the copolymer is limited within a certain range, and at the same time, each of the plurality of types of monomers to be the monomer components is limited in the factors such as the number of carbon atoms in the alkyl groups and the mass ratio between the monomers, and furthermore, the upper limit of the proportion of the low-molecular-weight component, in the copolymer, having a molecular weight equal to or less than a certain molecular weight is specified. Thus, the present inventors have thought up that the problem to be solved can be successfully solved, and accordingly the present inventors have reached the present invention.

That is, an aspect of the present invention is a laminated body including; an antireflection film (moth-eye film); and a protection film bonded onto the antireflection film, wherein the surface of the antireflection film includes a plurality of protrusions wherein the width between the tops of adjacent protrusions is equal to or less than the visible light wavelength; the protection film includes a supporting film and an adhesive layer in contact with the antireflection film; the adhesive layer is a layer constituted with a material formed by cross-linking, with a cross-linking agent (B), a (meth) acrylic acid ester copolymer (A); the weight-average molecular weight of the (meth)acrylic acid ester copolymer (A) is 600,000 or more and less than 1,500,000; the (meth) acrylic acid ester copolymer (A) is a copolymer formed by polymerizing monomer components including, in relation to the total amount of the monomer components set at 100% by mass, 70 to 98% by mass of a (meth)acrylic acid alkyl ester monomer (a) including a noncyclic alkyl group containing 4 to 9 carbon atoms, 1.5 to 25% by mass of a (meth)acrylic acid ester monomer (b) containing an aliphatic ring, and 0.5 to 5% by mass of a (meth)acrylic-based monomer (c) containing a functional group exhibiting reactivity with the cross-linking agent (B); and the area proportion of the components each having a molecular weight of 100,000 or less, obtained by gel permeation chromatography measurement, in relation to the area of the whole of the (meth)acrylic acid ester copolymer (A) set at 100%, is less than 3.0%.

The configuration of the laminated body is not especially limited by other components as long as it essentially includes such components. Each components and preferable embodiments of the laminated body are mentioned in more detail below. The configurations obtained by combining two or more of the following preferable configurations of the laminated body are also preferable configurations of the laminated body.

The laminated body includes the antireflection film and the protection film bonded onto the antireflection film. The bonding of the antireflection film onto a base material can reduce the reflection occurring on the surface of the base material; for example, the bonding of the laminated body of the present invention onto a front plate of a display device makes it possible to obtain a display device performing a satisfactory display low in reflected glare of the surrounding due to external light (for example, a fluorescent lamp inside a room) reflection.

The material of the base material to which the laminated body is bonded is not especially limited; examples of the material of the base material include glass, plastics and metals. The base material is not limited with respect to whether the base material is translucent or opaque. For an opaque base material, the laminated body of the present invention offers a surface antireflection effect for an opaque body; for example, for a black base material, a jet-black attractiveness is obtained, and for a colored base material, a high-color-purity attractiveness is obtained; thus, an article having a high quality of design is obtained. Examples of the articles to which the laminated body is suitably used include: constituent members of display devices (such as a self-emitting display element, a non-self-emitting display element, a light source, a light diffusion sheet, a prism sheet, a polarization reflection sheet, a retarder, a polarizing plate, a front plate and an enclosure), lenses, window glass, picture-flame glass, show window, a water tank, a printed matter, a photograph, a coated article and an illumination device.

The surface of the antireflection film includes the plurality of protrusions wherein the width between the tops of the adjacent protrusions is equal to or less than the visible light wavelength. In the present Description, the phrase "the width equal to or less than the visible light wavelength" means the width equal to or less than the lower limit of the general visible light wavelength range, namely, 380 nm; the width between the tops is more preferably 300 nm or less, and furthermore preferably 200 nm or less, namely, approximately one half of the visible light wavelength or less. When the width between the tops of the protrusions exceeds 400 nm, coloration due to the blue wavelength component occurs sometimes; however, the width set to be 300 nm or less sufficiently suppresses such an influence, and the width set to be 200 nm or less allows such an influence to almost vanish.

As long as the antireflection film includes the asperity structure on the surface thereof, the antireflection film may include another structure such as a film base material to support the protrusions. Such a film base material may be constituted with a material different from the material constituting the protrusions, and such a film base material may be translucent or opaque depending on the intended applications. The antireflection film may include an adhesive layer for bonding the structure including protrusions to an article as an object of the application of the antireflection film. In this case, the adhesive layer is formed on the side opposite to the side on which the protrusions are formed. The antireflection film may be formed directly on the base material as an object of the application of the antireflection film, without using the film base material, the adhesive layer or the like.

The protection film includes a supporting film and an adhesive layer in contact with the antireflection film. The protection film is once bonded to the adherend (antireflection film) and then can be peeled off when the adherend is used; the protection film has satisfactory adhesiveness, but does not cause adhesive deposit when the protection film is peeled off, so as not to degrade the properties of the antireflection film.

The adhesive layer is a layer constituted with a material formed by cross-linking, with the cross-linking agent (B), the (meth)acrylic acid ester copolymer (A). In other words, the adhesive layer is obtained by subjecting an adhesive composition including the (meth)acrylic acid ester copolymer (A) and the cross-linking agent (B) to a cross-linking reaction. The adhesive layer formed by using the adhesive composition having this combination has a satisfactory heat resistance, a satisfactory transparency and a satisfactory durability, and is suitably used as a protection film. The thickness of the adhesive layer is preferably 1 to 50 μm, and is more preferably 3 to 10 μm from the viewpoint of workability, costs and adhesive deposit.

The weight-average molecular weight of the copolymer (A) is 600,000 or more and less than 1,500,000. When the weight-average molecular weight is less than 600,000, low-molecular-weight compounds (components having a molecular weight of 100,000 or less) migrate into the gaps between the asperities of the surface of the moth-eye film to offer a cause for contamination. On the other hand, when the weight-average molecular weight is 1,500,000 or more, there is an adverse possibility that the control of the polymerization becomes insufficient and the molecular weight distribution becomes large, and thus the proportion of the low-molecular-weight compounds increases. The weight-average molecular weight of the copolymer (A) can be verified on the basis of the curve obtained by GPC measurement. In the case where the copolymer (A) is synthesized by living radical polymerization, when the weight-average molecular weight is high, the cost increase due to the increase of the polymerization time and the adverse factors such as the adverse effects to the environment due to the lowering of the solid content are of concern.

By setting the weight-average molecular weight at 800,000 to 1,400,000, the proportion of the low-molecular-weight compounds can be reduced, the cross-linking reaction is allowed to proceed to a sufficient extent, and the pollution can be more preferably reduced. The weight-average molecular weight is more preferably set at 1,000,000 to 1,300,000.

The copolymer (A) is a copolymer formed by polymerizing the monomer components including, in relation to the total amount of the monomer components set at 100% by mass, 70 to 98% by mass of the (meth)acrylic acid alkyl ester monomer (a) including the noncyclic alkyl group containing 4 to 9 carbon atoms. Herewith, while the introduction of other components is being ensured, an appropriate adhesive force can be imparted to the obtained adhesive layer (adhesiveness improvement). Also, from the same viewpoint, the proportion of the (meth)acrylic acid alkyl ester monomer (a) is set preferably at 75 to 94% by mass, and more preferably at 77 to 92% by mass.

The copolymer (A) is a copolymer formed by polymerizing the monomer components including, in relation to the total amount of the monomer components set at 100% by mass, 1.5 to 25% by mass of the (meth)acrylic acid ester monomer (b) containing the aliphatic ring. Herewith, the cohesive force and the storage modulus of the adhesive layer are improved, and when the adhesive layer penetrating deep into the asperity structure is peeled off, the residual contamination due to the causes such as tearing off can be prevented. When the content of the (b) component is too large, the adhesive layer becomes too hard, and zipping (occurrence of peeling sound) occurs at the time of peeling off, when the moth-eye surface is possibly damaged. From such a viewpoint, the content of the (b) component is more preferably 5 to 21% by mass, and furthermore preferably 6 to 20% by mass.

The copolymer (A) is a copolymer formed by polymerizing the monomer components including, in relation to the total amount of the monomer components set at 100% by mass, 0.5 to 5% by mass of the monomer (c) exhibiting reactivity with the cross-linking agent (B). Herewith, the copolymer (A) can be sufficiently cross-linked through the cross-linking agent (B), to prevent the bleeding of some of non-cross-linked components. On the other hand, when the content of the (c) component is too large, the cross-linking becomes excessive, and the adhesive force is possibly degraded. When the copolymerization number of parts of the (c) component, a high-polarity monomer, is too large, the control of the polymerization becomes insufficient, the proportion of the components having a molecular weight of 100,000 or less is increased, and the adverse effect that adhesive residue tends to be left can occur. From such a viewpoint, the content of the (c) component is more preferably 1 to 4% by mass and furthermore preferably 2 to 3% by mass.

The area proportion of the components each having a molecular weight of 100,000 or less, obtained by GPC measurement, in relation to the area of the whole of the copolymer (A) set at 100%, is less than 3.0%. Herewith, the adhesive deposit on the asperity surface at the time of peeling the protection film can be sufficiently reduced.

The cross-linking agent (B) in the adhesive composition is preferably at least one selected from the group consisting of an isocyanate-based cross-linking agent, an epoxy-based cross-linking agent, an aziridine-based cross-linking agent and a metal chelate-based cross-linking agent. From the viewpoint that the cross-linking reaction is mild and an appropriate strength and an appropriate flexibility can be imparted to the obtained adhesive layer, it is particularly preferable to use the isocyanate-based cross-linking agent as the cross-linking agent (B).

When the cross-linking agent (B) is the isocyanate-based cross-linking agent, the monomer (c) containing a functional group exhibiting reactivity with the cross-linking agent (B), in the copolymer (A) is preferably a hydroxyl group-containing monomer and particularly preferably a hydroxyalkyl (meth)acrylate. Herewith, a cross-linked structure having a high stability can be formed in the adhesive layer with an appropriate proportion.

When the cross-linking agent (B) is the epoxy-based cross-linking agent, the aziridine-based cross-linking agent, or the metal chelate-based cross-linking agent, the (meth) acrylic-based monomer (c) is preferably a carboxyl group-containing monomer or an amino group-containing monomer. Particularly preferably, the carboxyl group-containing monomer is an ethylenically unsaturated carboxylic acid, and the amino group-containing monomer is a monoalkylaminoalkyl (meth)acrylate.

The molecular weight distribution of the (meth)acrylic acid ester copolymer (A) is preferably 1.2 to 3.0. By setting the molecular weight distribution so as to fall within this range, the generated amount of the low-molecular-weight components can be reduced, and the adhesive layer can be prevented from partially flowing from the protection film into the asperity layer side of the antireflection film.

The area proportion of the components each having a molecular weight of 100,000 or less, obtained by GPC measurement, in relation to the area of the whole of the (meth)acrylic acid ester copolymer (A) set at 100%, is preferably 1.0% or more. In consideration of the production efficiency of the copolymer, the area proportion of the components each having a molecular weight of 100,000 or less is preferably at least larger than this lower limit.

The mixing amount of the cross-linking agent (B) in relation to 100 parts by mass of the (meth)acrylic acid ester copolymer (A) is preferably 0.01 to 15 parts by mass. By setting the mixing amount of the cross-linking agent (B) so as to fall within this range, the compatibility between the securement of a sufficient adhesive force and the prevention of the occurrence of the adhesive deposit due to the persistence of the unreacted cross-linking agent can be established.

The (meth)acrylic acid alkyl ester monomer (a) is preferably butyl acrylate. Herewith, the molecular weight distribution can be made narrow, the occurrence of the low-molecular-weight components can be reduced, and hence the prevention of the occurrence of the adhesive deposit is enabled.

The (meth)acrylic acid ester monomer (b) containing the aliphatic ring is preferably cyclohexyl (meth)acrylate. Herewith, satisfactory adhesiveness to the protrusion side of the moth-eye film can be obtained, and by allowing the adhesive to hold an appropriate strength, the prevention of the occurrence of the adhesive deposit due to the tearing off of the adhesive is enabled.

The gaps between the plurality of protrusions on the antireflection film each preferably include a shape sharpened toward the inside of the antireflection film. The gaps between the plurality of protrusions mean the recesses formed between the plurality of protrusions. Here, a recess may involve a plurality of sharpened shapes. When the ends of the recesses are sharpened, the apparent shapes of the protrusions due to the adhesive deposit (the surface shape of the antireflection film) tend to be changed and the degradation of the antireflection properties tends to occur, as compared to the flat end shapes of the recesses. The sharpened end shapes of the recesses are in excellent in the antireflection property as compared to the flat end shapes of the recesses. Accordingly, the protection film in the present invention is suitably used for the antireflection film including such protrusion shapes or such recess shapes.

Advantageous Effects of Invention

According to the present invention, it is possible to obtain a laminated body including a moth-eye film and a protection film excellent in the temporary adhesiveness with the moth-eye film and hardly undergoing the occurrence of adhesive deposit after being peeling off.

DESCRIPTION OF EMBODIMENTS

Figure 1:
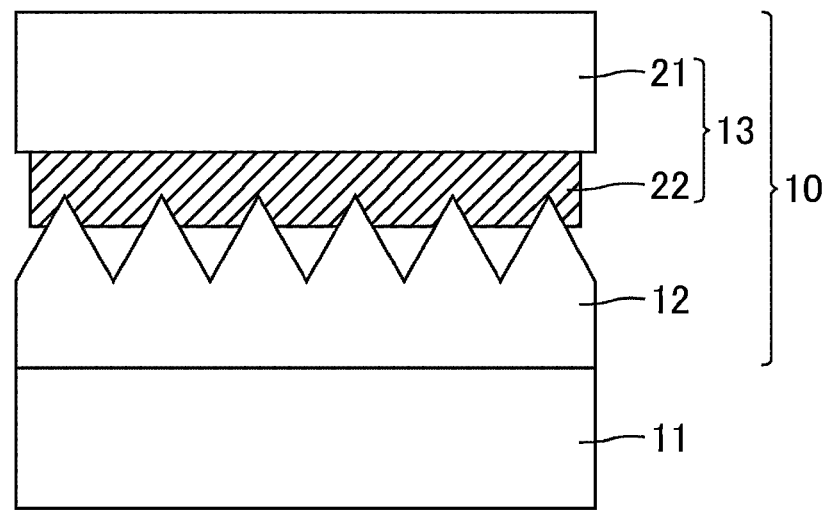
FIG. 1 is a schematic cross-sectional diagram of a laminated body of Embodiment 1.

The present invention will be mentioned in more detail referring to the drawings in the following embodiments, but is not limited to these embodiments.

Embodiment 1

FIG. 1 is a schematic cross-sectional diagram of a laminated body of Embodiment 1. As shown in FIG. 1, a laminated body 10 of Embodiment 1 includes an antireflection film 12 and a protection film 13 bonded onto the antireflection film 12. The laminated body of Embodiment 1 is bonded onto a base material 11, and can reduce the reflection occurring on the surface of the base material 11.

In Embodiment 1, as the antireflection film 12, a moth-eye film is used; the light incident on the surface of the moth-eye film 12 almost passes through the interface between the air and the moth-eye film 12 and the interface between the moth-eye film 12 and the base material 11, and hence it is possible to obtain a far excellent antireflection effect as compared to conventional optical interference antireflection films.

The laminated body 10 in Embodiment 1 can be used, for example, for the constituent members of display devices (such as a self-emitting display element, a non-self-emitting display element, a light source, a light diffusion sheet, a prism sheet, a polarization reflection sheet, a retarder, a polarizing plate, a front plate and an enclosure), lenses, window glass, picture-flame glass, show window, a water tank, a printed matter, a photograph, a coated article and an illumination device. Accordingly, the material of the base material 11 is not especially limited as long as the moth-eye film 12 can be placed and held on the base material 11; examples of the material of the base material 11 include glass, plastics and metals. The base material 11 is not limited with respect to whether the base material 11 is translucent or opaque. For an opaque base material, the laminated body of the present invention offers a surface antireflection effect for an opaque body; for example, for a black base material, a jet-black attractiveness is obtained, and for a colored base material, a high-color-purity attractiveness is obtained; thus, an article having a high quality of design is obtained. The shape of the base material 11 is not especially limited; examples of the shape of the base material 11 include melt-molded articles such as films, sheets, injection molded articles and press molded articles.

In actual use, the protection film 13 is peeled off from the moth-eye film 12, and then the laminated body is used. The constitution of the uppermost surfaces of various members, visually recognizable by the human being, with the surfaces on each of which the moth-eye film is disposed allows the surfaces excellent in low reflection property to be formed, and allows satisfactory visual recognition suppressed in reflected glare of the surrounding due to external light reflection to be obtained. However, the moth-eye film 12 tends to undergo dirt or flaws due to external factors, and there is a possibility that the effect of such dirt or flaws causes the quality degradation of the moth-eye film 12. Accordingly, in Embodiment 1, the laminated body 10 in which the protection film 13 is bonded to the surface of the moth-eye film 12 is applied to the uppermost surface of the article to protect the moth-eye film 12 from the external factors.

In Embodiment 1, the surface of the moth-eye film 12 is a portion exposed to the external environment after the protection film 13 is peeled off, and hence tends to undergo dirt. Accordingly, for the purpose of facilitating the removal of dirt, it is preferable to make the surface of the moth-eye film 12 be a hydrophilic surface by taking advantage of the molding material of the moth-eye structure and the surface area increasing effect based on fine structure. In this way, it is made easy to wipe off the dirt with water, and thus the moth-eye film 12 excellent in maintenance of the performances can be obtained.

The protection film 13 in Embodiment 1 includes a configuration in which an adhesive layer 22 is disposed on a supporting film 21, wherein the surface on which the adhesive layer 22 is disposed is bonded to the protrusion-bearing surface of the moth-eye film 12. According to the combination (laminated body) of the protection film 13 and the moth-eye film 12 of Embodiment 1, due to the property of the adhesive layer 22 described below, even when the protection film 13 is bonded for a predetermined time and subsequently the protection film 13 is peeled off, the adhesive agent does not remain in the gaps between the asperities of the moth-eye film 12, and hence it is possible to prevent the degradation of the antireflection effect due to the occurrence of the clogging of the asperities of the moth-eye film 12 and to maintain the excellent antireflection effect.

As described above, the protection film in Embodiment 1 is a protection film suitable for the moth-eye film in such a way that the protection film protects the surface of the moth-eye film, is excellent in adhesiveness and does not contaminate the adherend when peeled off.

Figure 2:
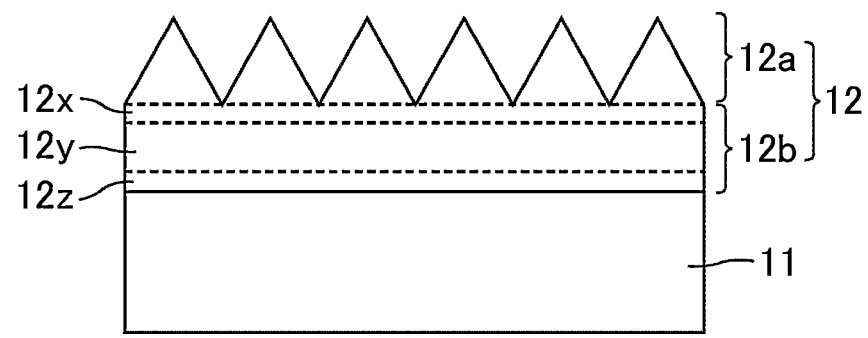
FIG. 2 is a schematic cross-sectional diagram of a moth-eye film of Embodiment 1.

Hereinafter, the moth-eye film (antireflection film) in Embodiment 1 is described in detail. FIG. 2 is a schematic cross-sectional diagram of a moth-eye film of Embodiment 1. As shown in FIG. 2, the antireflection film 12 of Embodiment 1 is disposed on the base material 11 to be the object of the antireflection treatment.

As shown in FIG. 2, the surface of the moth-eye film 12 includes a structure including a plurality of protrusions 12a wherein the spacing between the tops of adjacent protrusions 12a (the width between adjacent protrusions in the case of a non-periodic structure) or the pitch between adjacent protrusions (the width between adjacent protrusions in the case of a periodic structure) is equal to or less than the visible light wavelength. The moth-eye film 12 is constituted with such protrusions 12a and an underlying portion 12b located beneath the protrusions 12a (on the side of the base material 11).

The width between the tops of the adjacent protrusions 12a is equal to or less than the visible light wavelength or less; in other words, on the surface of the moth-eye film 12, a plurality of the protrusions 12a are arranged with the spacing or pitch equal to or less than the visible light wavelength. The case where the protrusions 12a in Embodiment 1 have no regularity in the arrangement thereof (non-periodic arrangement) offers an advantage such that no unnecessary diffraction light occurs, and hence is more preferable.

The underlying portion 12b includes a residual resin film layer 12x produced in the molding of the protrusions 12a, a film base material 12y for forming and holding the moth-eye structure and an adhesive layer 12z for bonding to the base material 11. The residual resin film layer 12x is a residual film formed of a fraction of the resin not incorporated into the protrusions 12a when the protrusions 12a are formed, and is formed of the same material as the material of the protrusions 12a.

As the material for the film base material 12y, for example, the following resin materials can be used: triacetyl cellulose; polyethylene terephthalate; polyolefin-based resins such as cyclic olefin-based polymers (typically, for example, norbornene-based resins such as Zeonoa (trade name) manufactured by ZEON Corp. and Arton (trade name) manufactured by JSR Corp.); polypropylene; polymethylpentene; a polycarbonate resin; polyethylene naphthalate; polyurethane; polyether ketone; polysulfone; polyether sulfone; polyester; a polystyrene-based resin; and an acrylic-based resin. On the surface of the film base material 12y, there may be formed the layers such as an anchor-treated layer and a hard coat layer for the purpose of increasing the adhesiveness.

The material of the adhesive layer 12z is not especially limited. A separator film (for example, a PET (polyethylene terephthalate)) to protect the adhesive layer 12z may be bonded onto the surface of the adhesive layer 12z on the side of the base material 11.

Figure 3:
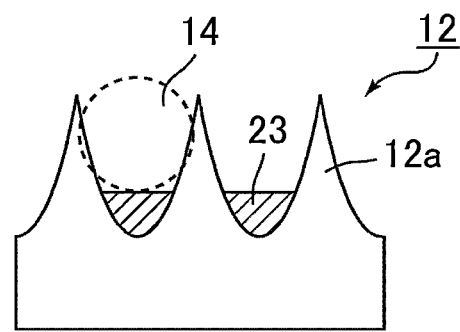
FIG. 3 is a schematic cross-sectional diagram illustrating a shape of a recess as the gap between protrusions of a moth-eye film in Embodiment 1, showing the shape of the end of the recess sharpened with a curvature.
Figure 4:
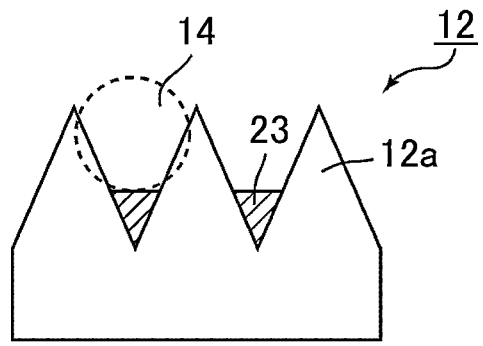
FIG. 4 is a schematic cross-sectional diagram illustrating a shape of a recess as the gap between protrusions of a moth-eye film in Embodiment 1, showing the sharpened shape of the end of the recess.
Figure 5:
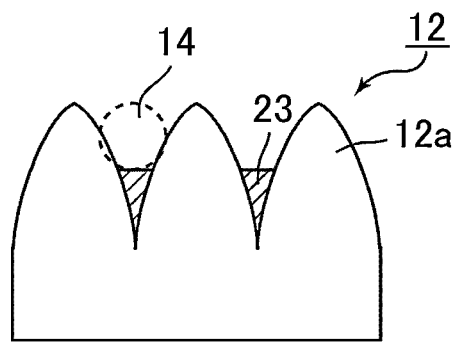
FIG. 5 is a schematic cross-sectional diagram illustrating a shape of a recess as the gap between protrusions of a moth-eye film in Embodiment 1, showing the acutely sharpened shape of the end of the recess.
Figure 6:
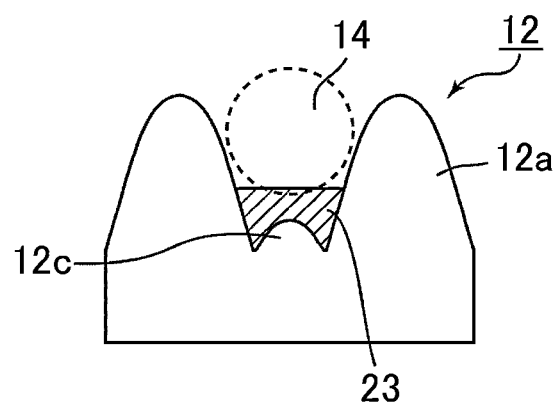
FIG. 6 is a schematic cross-sectional diagram illustrating a shape of a recess as the gap between protrusions of a moth-eye film in Embodiment 1, showing a plurality of sharpened shapes of the end of the recess.
Figure 7:
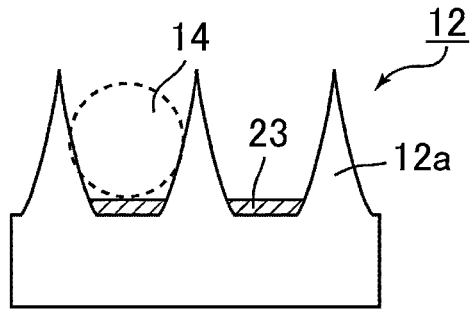
FIG. 7 is a schematic cross-sectional diagram illustrating a shape of a recess as the gap between the protrusions of a moth-eye film in Embodiment 1, showing the flat shape of the end of the recess including a trapezoidal shape as a whole.

FIGS. 3 to 7 are each a schematic cross-sectional diagram illustrating a shape of a recess as the gap between protrusions of a moth-eye film in Embodiment 1. FIG. 3 shows the shape of the end of the recess sharpened with a curvature; FIG. 4 shows the sharpened shape of the end of the recess; FIG. 5 shows the acutely sharpened shape of the end of the recess; FIG. 6 shows a plurality of sharpened shapes of the end of the recess; and FIG. 7 shows the flat shape of the end of the recess including a trapezoidal shape as a whole. From the viewpoint of the protrusions, the moth-eye film shown in FIG. 6 can also be said to include a shape including a small mound 12c between a plurality of the protrusions 12a.

The moth-eye film 12 shown in each of FIGS. 3 to 6, including a plurality of protrusions formed thereon and recesses in the gaps between the protrusions, includes a shape in which the end of each of the recesses 14 is sharpened toward the inside of the moth-eye film 12. An adhesive agent (adhesive residue) 23 is deposited in a portion of each of the recesses 14 as the gaps between the protrusions 12a of the moth-eye film 12. When the adhesive deposit (contamination) due to the adhesive agent 23 of the protection film occurs on the surface of the moth-eye film 12, no deformation of the protrusions 12a themselves occurs, but the apparent shapes of the protrusions are changed by the contamination due to the adhesive agent 23. Specifically, the value of the height (similarly, the aspect ratio: height/spacing or pitch) and the effective refractive index distribution due to the shape change are changed. Consequently, the properties of the moth-eye film 12 are also changed to result in a particularly large degradation of the antireflection property. On the other hand, in the moth-eye film 12 shown in FIG. 7 in which a plurality of the protrusions 12a including the recesses 14 in the gaps between the protrusions 12a is formed, flat planes are originally formed between the protrusions 12a, and hence even when the contamination due to the adhesive deposit of the adhesive agent 23 occurs, the apparent change of the structure is small.

Accordingly, the problem of the adhesive deposit is particularly remarkable in each of the moth-eye films including protrusions shown in FIGS. 3 to 6 or forming the recesses shown in FIGS. 3 to 6. The moth-eye films shown in FIGS. 3 to 6, in which the shapes of the ends of the recesses are sharpened, are excellent also from the viewpoint of the antireflection property before contamination, as compared to the moth-eye film, as shown in FIG. 7, in which the ends of the recesses each include a flat plane. Accordingly, the protection film in the present invention is suitably used particularly for such moth-eye films.

Hereinafter, the protrusions of the moth-eye film of Embodiment 1 are described in more detail.

Figure 8:
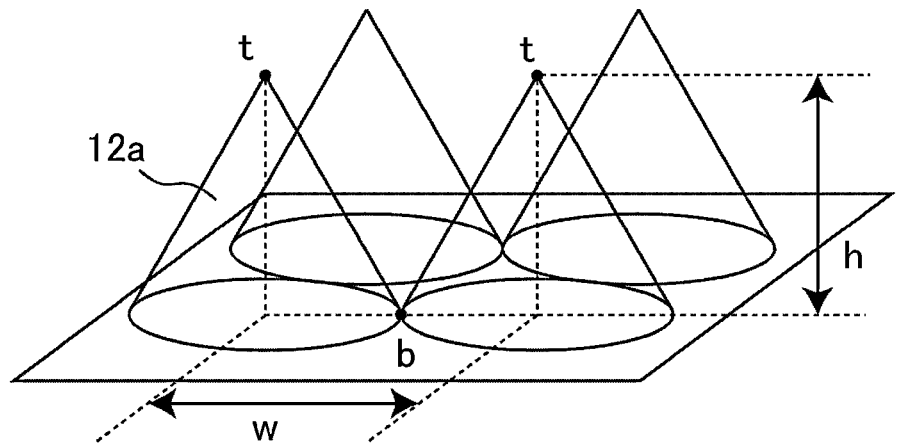
FIG. 8 is a schematic oblique perspective diagram of a moth-eye film of Embodiment 1, showing the case where a unit structure of a protrusion is conical.
Figure 9:
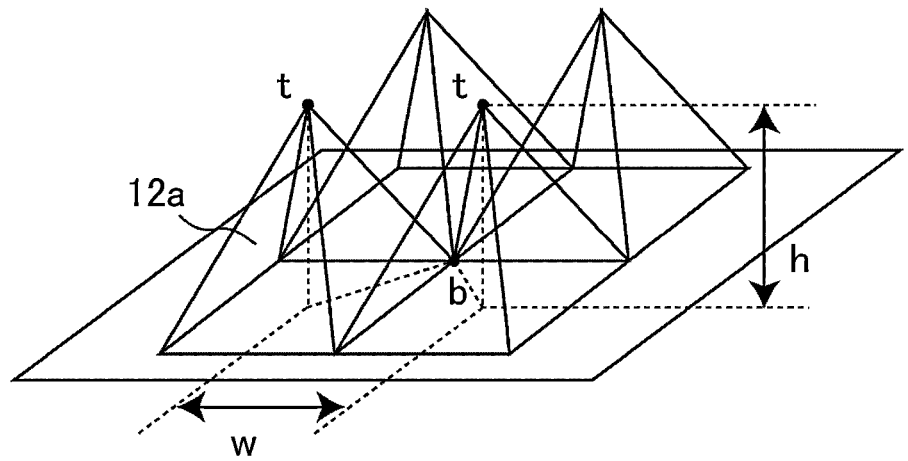
FIG. 9 is a schematic oblique perspective diagram of a moth-eye film of Embodiment 1, showing the case where a unit structure of a protrusion is a quadrangular pyramid.

FIG. 8 and FIG. 9 are each a schematic oblique perspective diagram of a moth-eye film of Embodiment 1. FIG. 8 shows the case where a unit structure of a protrusion is conical, and FIG. 9 shows the case where a unit structure of a protrusion is a quadrangular pyramid. As shown in each of FIG. 8 and FIG. 9, the summit of the protrusion 12a is the top t, and the point at which the protrusions 12a are brought into contact with each other is the bottom point b. As shown in each of FIG. 8 and FIG. 9, the width w between the tops of the adjacent protrusions 12a is represented by the distance between the two feet of the perpendiculars drawn from the two involved tops t to one and the same plane. The height h from the top to the bottom point of the protrusion 12a is represented by the distance from the top t of the protrusion 12a to the plane on which the bottom point b is located, along the perpendicular drawn from the top t to the aforementioned plane.

Figure 10:
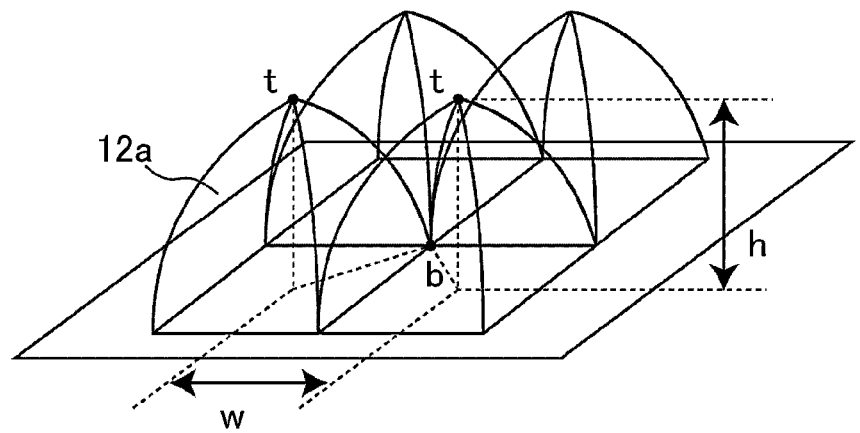
FIG. 10 is a schematic oblique perspective diagram of a moth-eye film of Embodiment 1, showing the case where a unit structure of a protrusion is a shape in which the slant becomes increasingly moderate on going from the bottom point to the top.
Figure 11:
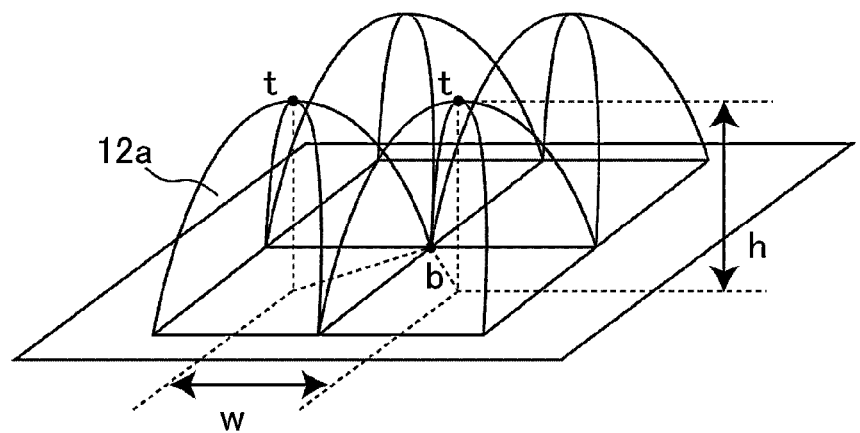
FIG. 11 is a schematic oblique perspective diagram of a moth-eye film of Embodiment 1, showing the case where a e unit structure of a protrusion is a shape in which the slant becomes increasingly moderate on going from the bottom point to the top.
Figure 12:
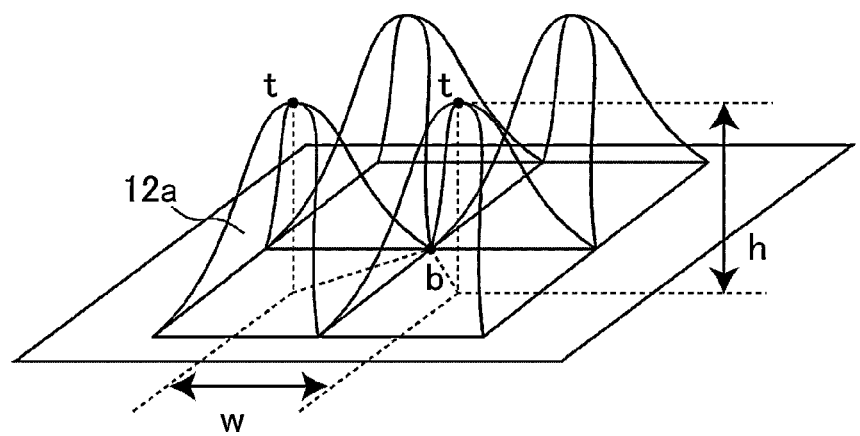
FIG. 12 is a schematic oblique perspective diagram of a moth-eye film of Embodiment 1, showing the case where a unit structure of a protrusion is a shape in which the slant partially becomes steep in a region between the bottom point and the top.
Figure 13:
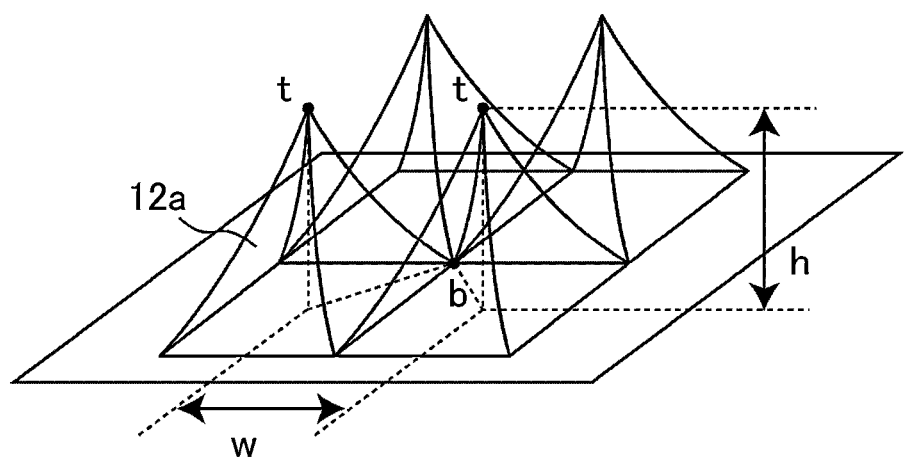
FIG. 13 is a schematic oblique perspective diagram of a moth-eye film of Embodiment 1, showing the case where a unit structure of a protrusion is a shape in which the slant becomes increasingly steeper on going from the bottom point to the top.

In the moth-eye film of Embodiment 1, the width w between the tops of the adjacent protrusions 12a is 380 nm or less, preferably 300 nm or less and more preferably 200 nm or less. In FIG. 8 and FIG. 9, as the examples of the unit structure of the protrusion 12a, a conical structure and a quadrangular pyramid are shown; with respect to the surface of the moth-eye film in Embodiment 1, the unit structure thereof is not especially limited as long as the surface includes the unit structure allowing the tops and the bottom points to be formed and the spacing between the protrusions or the pitch to be controlled; thus, for example, the following shapes may be adopted as the unit structure: a shape in which the slant becomes increasingly moderate on going from the bottom point to the top (a hanging bell shape, a bell shape or a dome shape) as shown in each of FIG. 10 and FIG. 11; a shape in which the slant partially becomes steep in a region between the bottom point and the top (sine shape) as shown in FIG. 12; a shape in which the slant becomes increasingly steeper on going from the bottom point to the top (needle-like shape) as shown in FIG. 13; and a shape in which the inclined plane of a cone has staircase-like steps.

Figure 14:
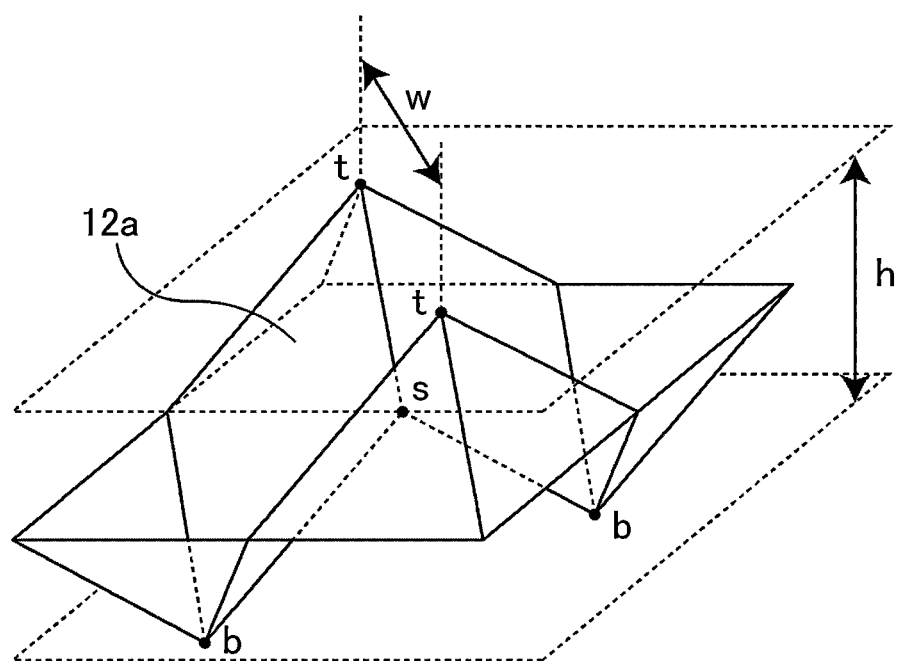
FIG. 14 is a schematic oblique perspective diagram of a moth-eye film of Embodiment 1, showing a case where a unit structure of a protrusion is a shape in which the height of the bottom point is different between adjacent protrusions and there are a saddle and a saddle point between the adjacent protrusions.
Figure 15:
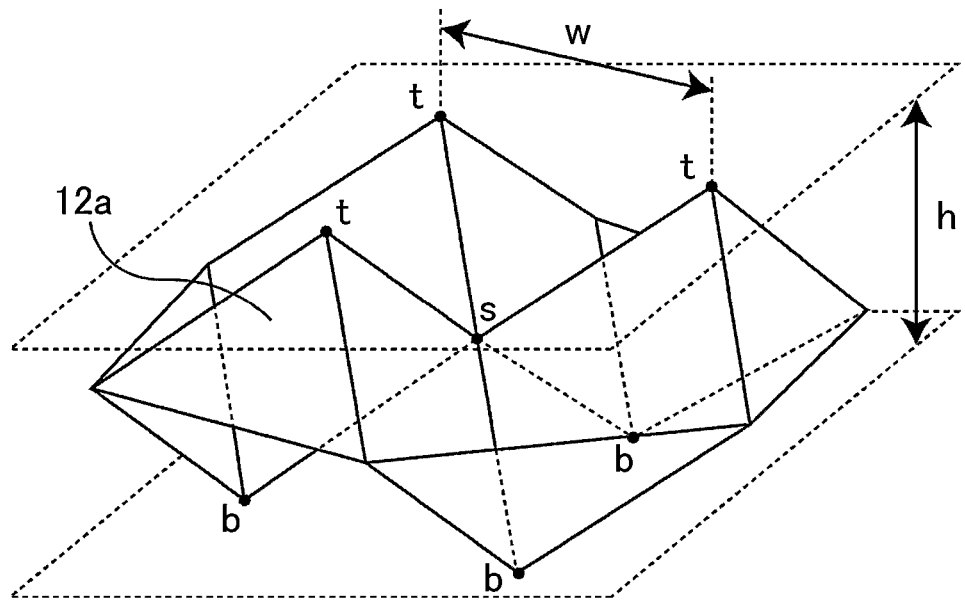
FIG. 15 is a schematic oblique perspective diagram of a moth-eye film of Embodiment 1, showing a case where a unit structure of a protrusion is a shape in which there are a plurality of contact points between adjacent protrusions and there are a saddle and a saddle point between the adjacent protrusions.
Figure 16:
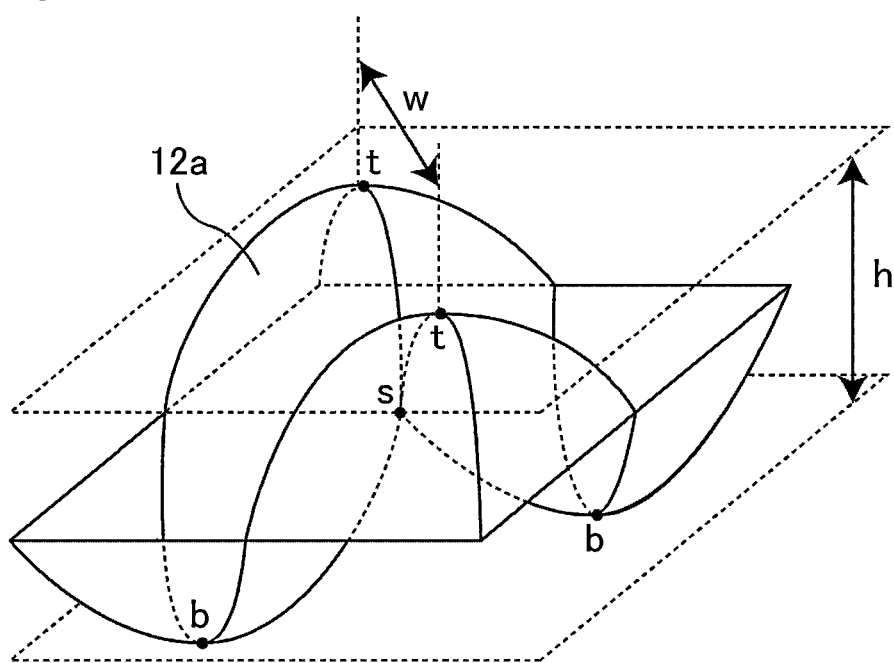
FIG. 16 is a schematic oblique perspective diagram of a moth-eye film of Embodiment 1, showing a case where a unit structure of a protrusion is a shape in which there are a plurality of contact points between adjacent protrusions and there are a saddle and a saddle point between the adjacent protrusions.

In Embodiment 1, the protrusions may have a plurality of arrangement regularities, or may have no arrangement regularity. Specifically, the shape of the surface of the moth-eye film is not necessarily such that the bottom points at each of which the adjacent protrusions 12a are brought into contact with each other are the same in height for any pair of the adjacent protrusions. For example, as shown in FIG. 14 to FIG. 16, the shape of the surface of the moth-eye film may be such that there are a plurality of heights of the points (contact points) on the surface allowing the protrusions 12a to be brought into contact with each other. In such cases, these shapes include saddles. The saddle means a recessed portion of a ridge connecting two peaks (according to Kojien fifth edition). With a protrusion including a top t as a reference, there are a plurality of contact points located lower than the top t so as to form a saddle; in the present Description, the lowest contact point located around any protrusion is defined as the bottom point b, and the point being located lower than the top t and higher than the bottom point b and being an equilibrium point of the saddle is also referred to as a saddle point s. In this case, the width w between the tops of the adjacent protrusions 12a corresponds to the distance between the adjacent tops, and the height h corresponds to the perpendicular direction distance from the top to the bottom point.

Figure 17:
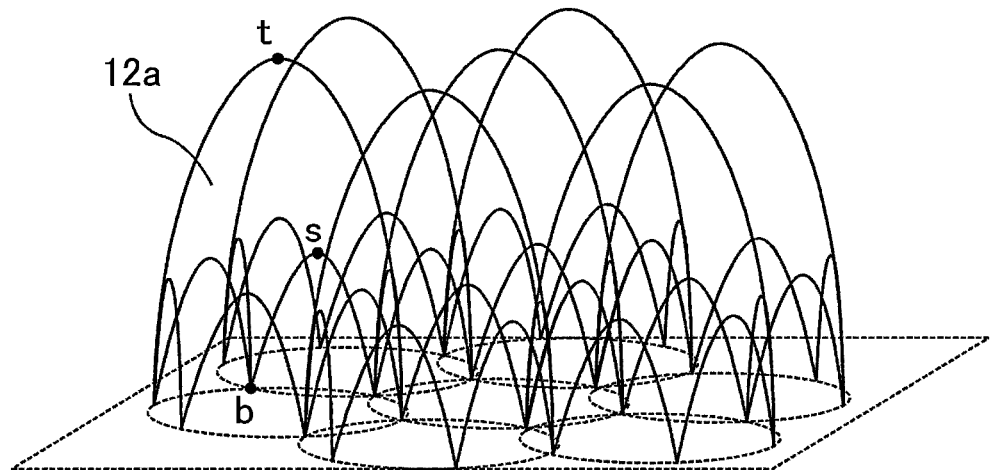
FIG. 17 is a schematic oblique perspective diagram showing in detail protrusions of a moth-eye film, as an enlarged diagram of the case where the protrusions are of a hanging bell shape and have saddles and saddle points.
Figure 18:
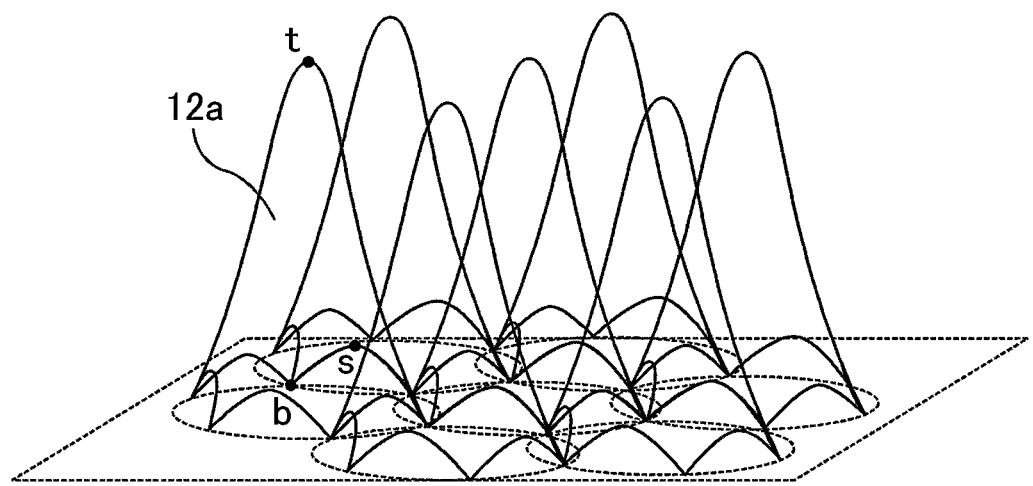
FIG. 18 is a schematic oblique perspective diagram showing in detail protrusions of a moth-eye film, as an enlarged diagram of the case where the protrusions are of a needle-like shape and have saddles and saddle points.

Hereinafter, a more detailed description is given. In particular, the following description is made by using an example of the case where when a protrusion including a top is taken as a reference, there are a plurality of contact points between the adjacent protrusions, and the contact points are located lower than the top t so as to form a saddle (saddle point). FIG. 17 and FIG. 18 are each a schematic oblique perspective diagram showing in detail protrusions of a moth-eye film. FIG. 17 is an enlarged diagram of the case where the protrusions are of a hanging bell shape and have saddles and saddle points; and FIG. 18 is an enlarged diagram of the case where the protrusions are of a needle-like shape and have saddles and saddle points. As shown in each of FIG. 17 and FIG. 18, in relation to a top t of the protrusion 12a, there are a plurality of contact points with the adjacent protrusions located lower than the top t, and hence the surface of the moth-eye film includes saddles. As can be seen from a comparison between FIG. 17 and FIG. 18, as far as the hanging bell shape and the needle-like shape are concerned, the saddles tend to be formed so as to be higher in height in the hanging bell shape than in the needle-like shape.

Figure 19:
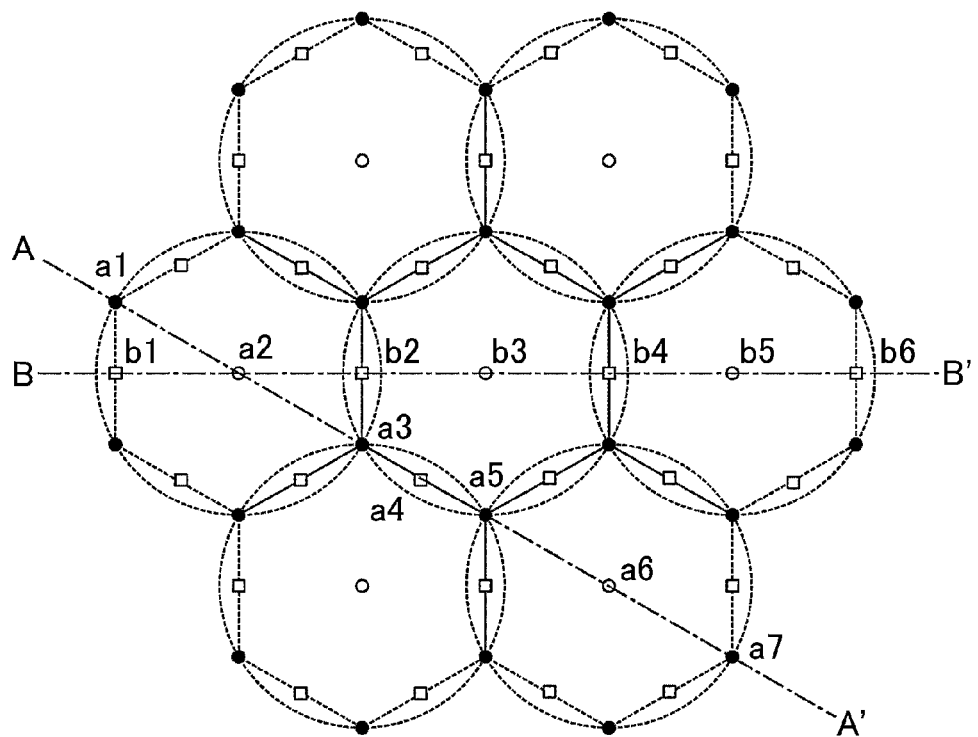
FIG. 19 is a schematic plan diagram in which protrusions and recesses of a moth-eye structure are more enlarged.

FIG. 19 is a schematic plan diagram in which protrusions and recesses of a moth-eye structure are more enlarged. In FIG. 19, the blank circles (○) represent the tops, the solid black circles (●) represent the bottom points and the blank squares (□) represent the saddle points of the saddles. As shown in FIG. 19, the bottom points and the saddle points are formed on concentric circles each having a top as the center thereof. FIG. 19 schematically shows a case where six bottom points and six saddle points are formed on a circle; however, actual cases are not limited to this case but include more irregular cases.

Figure 20:
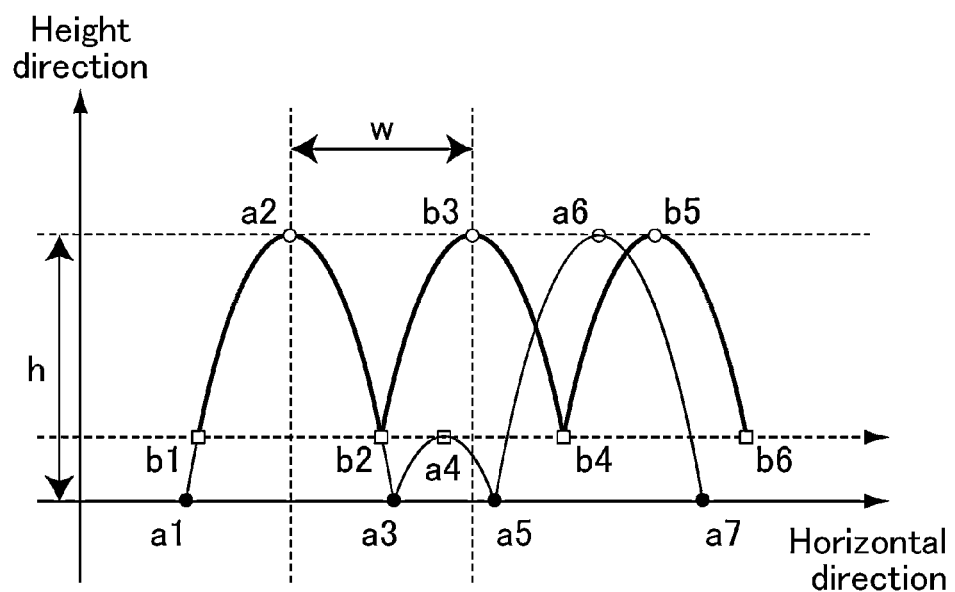
FIG. 20 is a schematic diagram showing the cross section along the line segment A-A' in FIG. 19 and the cross section along the line segment B-B' in FIG. 19.

FIG. 20 is a schematic diagram showing the cross section along the line segment A-A' in FIG. 19 and the cross section along the line segment B-B' in FIG. 19. The tops are represented by a2, b3, a6 and b5, the saddles are represented by b1, b2, a4, b4 and b6, and the bottom points are represented by a1, a3, a5 and a7. In this case, the relation between a2 and b3 and the relation between b3 and b5 are each the relation between the adjacent tops; the distance between a2 and b3 and the distance between b3 and b5 each correspond to the distance w between the adjacent tops. The height between a2 and a1 or a3 and the height between a6 and a5 or a7 each correspond to the height h of the protrusion.

Figure 21:
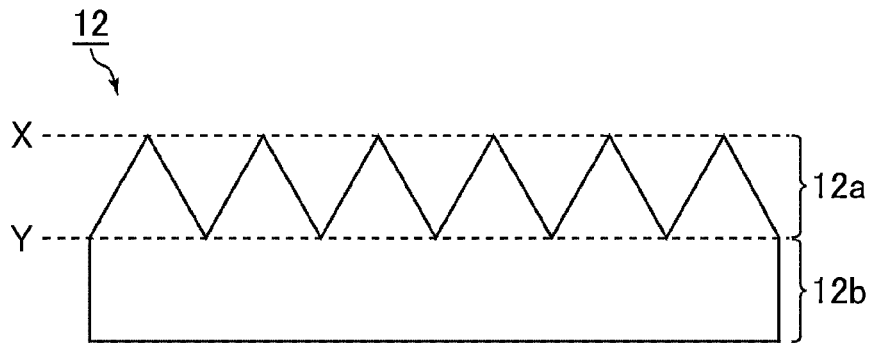
FIG. 21 is a schematic diagram illustrating the principle according to which a moth-eye film of Embodiment 1 realizes low reflection, wherein a cross-sectional structure of the moth-eye film is shown.
Figure 22:
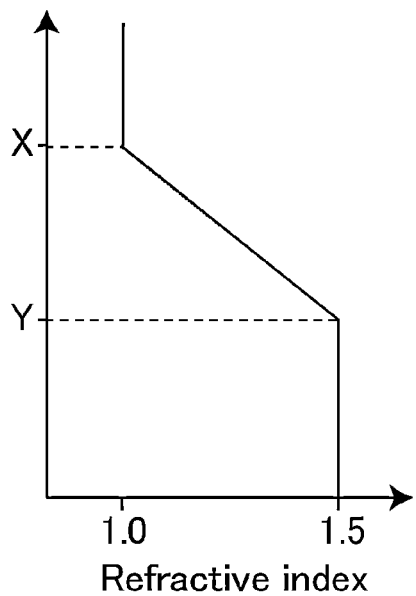
FIG. 22 is a schematic diagram illustrating the principle according to which a moth-eye film of Embodiment 1 realizes low reflection, wherein the change of the refractive index sensed by the light incident on the moth-eye film is shown.

Here, the principle according to which the moth-eye film of Embodiment 1 realizes low reflection is described. FIG. 21 and FIG. 22 are schematic diagrams illustrating the principle according to which a moth-eye film of Embodiment 1 realizes low reflection. FIG. 21 shows the cross-sectional structure of the moth-eye film, and FIG. 22 shows the change of the refractive index (effective refractive index) sensed by the light incident on the moth-eye film. As shown in FIG. 21 and FIG. 22, the moth-eye film 12 of Embodiment 1 is constituted with the protrusions 12a and the underlying portion 12b. When light proceeds from one medium into another medium, the light is refracted, transmitted and reflected at the interface between these media. The degree of the refraction or the like is determined by the refractive indexes of the media through which the light proceed; for example, air has a refractive index of approximately 1.0 and a resin has a refractive index of approximately 1.5. In Embodiment 1, the unit structure of the asperity structure formed on the surface of the moth-eye film 12 is approximately conical; in other words, the unit structure includes a shape gradually narrowing toward the end thereof. Accordingly, as shown in FIG. 21 and FIG. 22, in the protrusions 12a located in the interface between the air layer and moth-eye film 12 (between X and Y), the refractive index can be regarded as increased gradually from the refractive index of air of approximately 1.0 to the refractive index of the film constituting material (approximately 1.5 when the film constituting material is a resin). The reflection magnitude of light depends on the refractive index difference between the media involved, and hence the thus obtained quasi non-existence of the optical refractive-index interface allows the light to virtually pass through the moth-eye film 12, and consequently the reflectance on the film surface is significantly reduced. FIG. 21 shows as an example an approximately conical asperity structure, but the asperity structure is not limited to this structure; there may be adopted any other asperity structure resulting in the moth-eye antireflection effect based on the aforementioned principle.

From the viewpoint of the optical properties, mechanical properties and production, an example of the preferable profile of the plurality of protrusions constituting the surface of the moth-eye film 12 includes a shape in which the width (spacing or pitch) between the mutually adjacent protrusions is 20 nm or more and 200 nm or less, and the protrusion height is 50 nm or more and 400 nm or less. FIG. 1 to FIG. 22 show the shapes in each of which the plurality of the protrusions 12a are arranged as a whole with the repeating units having a period equal to or less than the visible light wavelength; however, such shapes may include portions having no periodicity, or may have no periodicity as a whole. The widths between any one protrusion among a plurality of the protrusions and the two or more protrusions adjacent to the any one protrusion may be different from each bother. The shape having no periodicity has a performance-related advantage that the diffraction scattering of transmission and reflection due to the periodic arrangement hardly occurs, and a production-related advantage that such patterns are easy to produce. Further, as shown in FIGS. 14 to 20, in the moth-eye film 12, a plurality of the bottom points different in height from each other may be formed around one protrusion. The surface of the moth-eye film 12 may include asperities larger than the order of nanometers and equal to or larger than the order of microns; in other words, the surface of the moth-eye film 12 may include a dual asperity structure.

Hereinafter, the method for forming the moth-eye film 12 is described. First, a glass substrate is prepared, and a film of aluminum (Al) to be the material for a mold is formed on the glass substrate by a sputtering method. Next, a repetition of a step of anode oxidizing the sputtered aluminum and etching the anode-oxidized aluminum results in the formation of an anode-oxidized layer including a large number of micro-holes in which the distances between the bottom points of adjacent holes (recesses) are equal to or less than the visible light wavelength. Specifically, a mold can be prepared by performing a flow (including five times of anode oxidation and four times of etching) in which anode oxidation, etching, anode oxidation, etching, anode oxidation, etching and anode oxidation are performed in the stated order. Such a step of repeating the oxidation and the etching results in the shape (taper shape) of the formed micro holes, tapering off toward the inside of the mold. The substrate of the mold is not limited to glass; examples of the material for the substrate of the mold include: metal materials such as SUS and Ni and the following resin materials: polypropylene; polymethylpentene; polyolefin-based resins such as cyclic olefin-based polymers (typically, for example, norbornene-based resins such as Zeonoa (trade name) manufactured by ZEON Corp. and Arton (trade name) manufactured by JSR Corp.); a polycarbonate resin; polyethylene terephthalate; polyethylene naphthalate; and triacetyl cellulose. Instead of the substrate on which an aluminum film is formed, an aluminum bulk substrate may also be used. The shape of the mold may be either a plate shape or a roll shape (cylinder).

An example of an actually prepared mold is described. First, a 10 cm square glass substrate was prepared, and an aluminum (Al) film to be a material for the mold was formed in a thickness of 1.0 µm on the glass substrate by using a sputtering method. The thickness of the aluminum (Al) film to be the material for the mold was set at 1.0 µm. The anode oxidation conditions were such that the oxalic acid concentration was 0.6% by weight and the solution temperature was 5° C. and the applied voltage was 80 V. The regulation of the anode oxidation time resulted in the different sizes (depths) of the formed holes. The relation between the anode oxidation time and the size (depth) of the hole is shown in Table 1. In any examples, the etching conditions were such that the concentration of phosphoric acid was 1 mol/l and the solution temperature was 30° C. and the etching time was 25 minutes.

TABLE 1

|  | Anode oxidation time (sec.) | Depth of recess (nm) | Height of protrusion (nm) | Transfer ratio | Aspect ratio |
| --- | --- | --- | --- | --- | --- |
| Mold 1 | 15 | 231 | 143 | 0.62 | 0.72 |
| Mold 2 | 20 | 328 | 175 | 0.53 | 0.88 |
| Mold 3 | 24 | 387 | 219 | 0.57 | 1.10 |
| Mold 4 | 33 | 520 | 255 | 0.49 | 1.28 |
| Mold 5 | 38 | 600 | 373 | 0.62 | 1.87 |

Next, a 2P (photopolymerizable) resin solution having translucency was dropwise placed on the surface of the mold prepared by such a production method, and a base material (for example, a TAC film) was bonded onto the 2P resin layer formed of the 2P resin solution while attention was being paid not to incorporate bubbles. Then, the 2P resin layer was irradiated with ultraviolet (UV) light with an energy density of 2 J/cm$^2$ to be cured, and then, the laminated film composed of the 2P resin film formed by curing and the TAC film was peeled off. Examples of the specific methods for forming (reproducing) the fine asperities on the base material by using a mold include, in addition to the 2P method (photo-polymerization method): reproduction methods such as a heat-press method (emboss method), an injection molding method and a sol-gel method; or various methods such as a method of laminating a fine-asperity preform sheet and a method of transferring a fine-asperity layer; these different methods may be appropriately selected according to the applications of antireflection articles, the materials of the base material and the like.

The surface of any of the moth-eye films prepared by the 2P method exhibited hydrophilicity and was found to have a contact angle with water of 15° or less. As is known, when the surface includes a fine-asperity structure, due to the surface area increase effect, the surface formed of a hydrophobic (water repellent) material results in a super hydrophobicity (lotus effect) and the surface formed of a hydrophilic material results in a superhydrophilicity. Accordingly, an appropriate selection of the material forming the asperity structure and the asperity shape allows the production of moth-eye antireflection articles exhibiting various surface conditions from hydrophilic conditions to hydrophobic (water repellent) conditions. When the surface of the moth-eye antireflection article is hydrophilic, the dirt attached to the surface can be removed by wiping with water, and hence sufficient performance maintainability is brought out. When the surface of the moth-eye antireflection article is hydrophobic (water repellent), aqueous dirt hardly adheres to the surface, and hence a sufficient antifouling property is brought out. From the viewpoint of the contamination of the protection film by the adhesive agent, the contamination tends to remarkably occur in the case where the surface of the moth-eye antireflection article is hydrophilic, accordingly the protection film of the present invention is suitably used for the moth-eye antireflection article exhibiting hydrophilicity and, on the other hand, can also be applied to the moth-eye antireflection article exhibiting hydrophobicity (water repellency).

The depth of the recess of the mold and the height of the protrusion of the moth-eye film can be measured by using a SEM (Scanning Electron Microscope). The contact angle with water of the surface of the moth-eye antireflection article can be measured by using a contact angle meter.

Examples of the materials for forming the asperity structure (moth-eye structure) of the moth-eye film include: active energy ray-curable resin compositions typified by the aforementioned photocurable resin compositions and electron beam curable resin compositions; and heat-curable resin compositions.

In the present Description, the monomer and/or oligomer polymerizable with active energy ray, irrespective of organic or inorganic, is only required to be polymerized to yield a polymer, in the presence or absence of a photopolymerization initiator, by the irradiation of active energy ray such as ultraviolet ray, visible energy ray and infrared ray; such a monomer and/or such an oligomer may be radical polymerizable, anion polymerizable or cation polymerizable. Examples of such a monomer and/or such an oligomer include monomers and/or oligomers including in the molecules thereof a vinyl group, a vinylidene group, an acryloyl group, a methacryloyl group (hereinafter, an acryloyl group and a methacryloyl group are also collectively referred to as a (meth)acryloyl group, and this is also the case for (meth)acrylic and (meth)acrylate); preferable among these are monomers and/or oligomers including a (meth)acryloyl group(s) because of the fast polymerization rate under irradiation with active energy ray. The active energy ray-curable resin composition may include a nonreactive polymer and an active energy ray sol-gel reactive composition.

Examples of a method for hydrophilizing the surface of a molded article include: physical treatments such as corona treatment, plasma treatment and ultraviolet treatment; chemical surface treatments such as sulfonation; kneading of a surfactant or a hydrophilic substance; use of a hydrophilic group-containing polymer as a molding material; and coating with a hydrophilic polymer. Also included is a method of graft polymerization of a hydrophilic monomer to the surface of a polymer molded article. Examples of the active energy ray-curable composition capable of forming a hydrophilic coating include: an ultraviolet ray-curable composition including polyalkylene glycol (meth)acrylate and a reactive surfactant containing in the molecule thereof an alkylene oxide bond; an ultraviolet ray-curable composition including a multifunctional acrylate containing in the molecule thereof two or more hydroxyl groups and a reactive surfactant containing in the molecule thereof an alkylene oxide bond; an energy ray-curable composition including an amphiphilic polymerizable compound containing a polyethylene glycol chain having a number of repetitions of 6 to 20; and a photocurable composition including polyurethane (meth)acrylate, a diacrylate containing a cyclic structure and a polyalkylene glycol acrylate.

Examples of the active energy ray-polymerizable monomer include:

monofunctional monomers such as ethyl (meth)acrylate, n-butyl (meth)acrylate, isobutyl (meth)acrylate, t-butyl (meth)acrylate, hexyl (meth)acrylate, 2-ethylhexyl (meth) acrylate, lauryl (meth)acrylate, stearyl (meth)acrylate, phenyl (meth)acrylate, phenyl cellosolve (meth)acrylate, nonylphenoxypolyethylene glycol (meth)acrylate, isobornyl (meth)acrylate, dicyclopentanyl (meth)acrylate and dicyclopentenyloxyethyl (meth)acrylate;

bifunctional monomers such as 1,6-hexanediol di(meth) acrylate, polypropylene glycol di(meth)acrylate, hydroxypivalic acid neopentyl glycol di(meth)acrylate, neopentyl glycol di(meth)acrylate, 3-acryloyloxyglycerin monomethacrylate, 2,2'-bis(4-(meth)acryloyloxy polyethylene oxyphenyl)propane, 2,2'-bis(4-(meth)acryloyloxy polypropylene oxyphenyl)propane, dicyclopentanyl di(meth) acrylate, bis[(meth)acryloyloxyethyl]hydroxyethyl isocyanate, phenyl glycidyl ether acrylate tolylene diisocyanate and divinyl adipate;

trifunctional monomers such as trimethylolpropane tri (meth)acrylate, trimethylolethane tri(meth)acrylate, tris [(meth)acryloylioxyethyl]isocyanate and pentaerythritol tri (meth)acrylate;

tetrafunctional monomers such as pentaerythritol tetra (meth)acrylate and glycerin di(meth)acrylate hexamethylene diisocyanate;

pentafunctional monomers such as dipentaerythritol monohydroxypenta(meth)acrylate; and hexafunctional monomers such as dipentaerythritol hexa (meth)acrylate.

The active energy ray-polymerizable oligomer is an oligomer containing a polymerizable functional group that can be polymerized by active energy ray, and such oligomers having a molecular weight of 500 to 50,000 are preferable. Examples of such oligomers include: (meth)acrylic acid esters of epoxy resin such as bisphenol A-diepoxy-(meth) acrylic acid adduct; (meth)acrylic acid esters of polyether resin; (meth)acrylic acid esters of polybutadiene resin; and polyurethane resins containing a (meth)acrylic group at the molecular end thereof.

These active energy ray-polymerizable monomers and/or oligomers may be used each alone or in combinations of two or more of these monomer and oligomer materials, for example, as mixtures of two or more monomers, mixtures of two or more oligomers, or mixtures of a monomer(s) and an oligomer(s).

The selection of the active energy ray-polymerizable monomers and/or oligomers enables optional control of the cross-linking density of the moth-eye structure (namely, a cured product of a preform formed of an active energy ray-polymerizable monomer(s) and/or oligomer(s)) of the molded article including a hydrophilic surface.

The selection of a hydrophobic (water repellent) monomer(s) and/or a hydrophobic oligomer(s) as the active energy ray-polymerizable monomer(s) and/or oligomer(s) enables formation of a moth-eye structure including a hydrophobic (water repellent) surface.

The photopolymerization initiator is not especially limited, as long as the photopolymerization initiator is active to the active energy ray used in the present invention, and can polymerize a monomer(s) and/or an oligomer(s), and a hydrophilic monomer(s) and/or a hydrophilic oligomer(s); examples of the usable photopolymerization initiator include a radical polymerization initiator, an anion polymerization initiator and a cation polymerization initiator. Examples of such a polymerization initiator include: acetophenones such as p-tert-butyltrichloroacetophenone, 2,2'-diethoxyacetophenone and 2-hydroxy-2-methyl-1-phenyl-propan-1-one; ketones such as benzophenone, 4,4'-bisdimethylaminobenzophenone, 2-chlorothioxanthone, 2-methylthioxanthone, 2-ethylthioxanthone and 2-isopropylthioxanthone; benzoin ethers such as benzoin, benzoin methyl ether, benzoin isopropyl ether and benzoin isobutyl ether; and benzil ketals such as benzil methyl ketal and hydroxycyclohexyl phenyl ketone.

The hydrophilic monomer and/or the hydrophilic oligomer is (are) a monomer and/or an oligomer containing in the molecule thereof a hydrophilic group; examples of such a hydrophilic group include: nonionic hydrophilic groups such as a polyethylene glycol group, a polyoxymethylene group, a hydroxyl group, a sugar-containing group, an amide group and a pyrrolidone group; anionic hydrophilic groups such as a carboxyl group, a sulfone group and a phosphoric acid group; cationic hydrophilic groups such as an amino group and an ammonium group; and zwitterionic groups such as an amino acid-containing group and a phosphoric acid group/an ammonium ion group. Such a hydrophilic group may also be the derivatives of these groups; examples of such derivatives include: N-substituted products of an amino group, an amide group, an ammonium group and a pyrrolidone group. The hydrophilic monomer and/or the hydrophilic oligomer may contain in the molecule thereof a single hydrophilic group or a plurality of hydrophilic groups, and may contain a plurality of types of hydrophilic groups.

Examples of the hydrophilic monomer and/or the hydrophilic oligomer include:

hydroxyl group-containing monomers such as 2-hydroxyethyl (meth)acrylate, 2-hydroxypropyl (meth)acrylate and glycerol mono(meth)acrylate;

polyethylene glycol structural unit-containing monomers such as diethylene glycol mono(meth)acrylate, triethylene glycol mono(meth)acrylate, tetraethylene glycol mono (meth)acrylate, nonaethylene glycol mono(meth)acrylate, tetradecaethylene glycol mono(meth)acrylate, trieicosaethylene glycol mono(meth)acrylate, polyethylene glycol mono (meth)acrylate, methoxydiethylene glycol (meth)acrylate, methoxytriethylene glycol (meth)acrylate, methoxytetraethylene glycol (meth)acrylate, methoxynonaethylene glycol (meth)acrylate, methoxytetradecaethylene glycol (meth) acrylate, methoxytrieicosaethylene glycol (meth)acrylate, methoxypolyethylene glycol (meth)acrylate, phenoxydiethylene glycol (meth)acrylate, phenoxytetraethylene glycol (meth)acrylate, phenoxyhexaethylene glycol (meth)acrylate, phenoxynonaethylene glycol (meth)acrylate and phenoxypolyethylene glycol (meth)acrylate;

amide group-containing monomers such as N-ethyl(meth) acrylamide, N-n-propyl(meth)acrylamide, N-isopropyl (meth)acrylamide, N-cyclopropyl(meth)acrylamide, N-methyl-N-ethyl(meth)acrylamide, N,N-dimethyl(meth) acrylamide, N,N-diethyl(meth)acrylamide, N-methyl-N-isopropyl(meth)acrylamide, N-methyl-N-n-propyl(meth)acrylamide, N-(meth)acryloylmorpholine, N-(meth) acryloylpyrrolidine, N-(meth)acryloylpiperidine, N-vinyl-2-pyrrolidone, N-methylenebisacrylamide, N-methoxypropyl (meth)acrylamide, N-isopropoxypropyl(meth)acrylamide, N-ethoxypropyl(meth)acrylamide, N-1-methoxymethylpropyl(meth)acrylamide, N-methoxyethoxypropyl(meth)acrylamide, N-1-methyl-2-methoxyethyl(meth)acrylamide, N-methyl-N-n-propyl(meth)acrylamide and N-(1,3-dioxolan-2-yl)(meth)acrylamide;

amino group-containing monomers such as N,N-dimethylaminoethyl(meth)acrylate, N,N-dimethylaminopropyl (meth)acrylamide, N,N-(bismethoxymethyl)carbamyloxyethyl methacrylate and N-methoxymethylcarbamyloxyethyl methacrylate;

carboxyl group-containing monomers such as 2-(meth) acryloyloxyethyl phthalic acid, 2-(meth)acryloyloxypropyl phthalic acid and 2-(meth)acryloyloxyethyl succinic acid;

phosphoric acid group-containing monomers such as mono(2-methacryloyloxyethyl) acid phosphate and mono(2-acryloyloxyethyl) acid phosphate;

quaternary ammonium base-containing monomers such as (meth)acryloyloxyethyltrimethyl ammonium chloride and (meth)acryloyloxypropyltrimethyl ammonium chloride;

sulfone group-containing monomers such as 2-acrylamide-2-methylpropanesulfonic acid, 2-acrylamide-2-phenylpropanesulfonic acid, sodium (meth)acryloyloxyethylsulfonate, ammonium (meth)acryloyloxyethylsulfonate, allylsulfonic acid, methallylsulfonic acid, vinylsulfonic acid, styrenesulfonic acid and sulfonic acid sodium ethoxymethacrylate; and polymerizable oligomers containing these hydrophilic groups, each having a molecular weight of 500 to 50,000. As hydrophilic monomers and/or hydrophilic oligomers, (meth) acrylic monomers and/or oligomers each containing an amino acid skeleton in the molecule thereof may also be used. Further, as hydrophilic monomers and/or hydrophilic oligomers, (meth)acrylic monomers and/or oligomers each containing a sugar skeleton in the molecule thereof may also be used.

Figure 23:
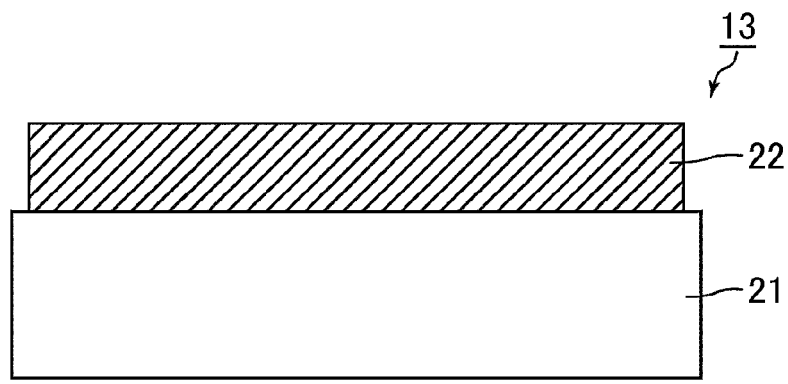
FIG. 23 is a schematic cross-sectional diagram of a protection film of Embodiment 1.

Hereinafter, the protection film in Embodiment 1 is described. FIG. 23 is a schematic cross-sectional diagram of a protection film of Embodiment 1. As shown in FIG. 23, the protection film 13 of Embodiment 1 includes the supporting film 21 and the adhesive layer 22. The type and the material of the supporting film 21 is not especially limited; examples of the supporting film 21 include resins such as PET (polyethylene terephthalate).

Hereinafter, the adhesive layer 22 in Embodiment 1 is described in detail. In Embodiment 1, the adhesive layer 22 is obtained by subjecting an adhesive composition including the (meth)acrylic acid ester copolymer (A) and the cross-linking agent (B) to a cross-linking reaction.

<(Meth)Acrylic Acid Ester Copolymer (A)>

The (meth)acrylic acid ester copolymer (A) includes a chemical structure derived at least from the following monomer units: a (meth)acrylic acid alkyl ester monomer (a) containing a noncyclic alkyl group having 4 to 9 carbon atoms, a (meth)acrylic acid ester monomer (b) containing an aliphatic ring, and a monomer (c) containing a functional group reactive with the cross-linking agent (B). The (meth) acrylic acid alkyl ester means both acrylic acid alkyl ester and methacrylic acid alkyl ester. Other similar terms are also understood similarly.

The copolymer (A) includes the monomer unit derived from the (meth)acrylic acid alkyl ester monomer (a) containing a noncyclic alkyl group having 4 to 9 carbon atoms, and hence can impart an appropriate adhesive force to the obtained adhesive layer.

Preferable examples of the (meth)acrylic acid alkyl ester monomer (a) include butyl (meth)acrylate, pentyl (meth) acrylate, hexyl (meth)acrylate, 2-ethylhexyl (meth)acrylate and isooctyl (meth)acrylate. From the viewpoint of imparting an appropriate adhesive force, butyl (meth)acrylate or 2-ethylhexyl (meth)acrylate is particularly preferable. Among these, by adopting butyl acrylate as the main monomer (the monomer accounting for the largest mass ratio), the molecular weight distribution can be made narrow and the proportion of the components each having a molecular weight of 100,000 or less can be decreased. The monomers (a) may be used in combinations of two or more thereof.

From the viewpoint of ensuring the introduction of other monomers and exhibiting an appropriate adhesive force, the mixing proportion of the (meth)acrylic acid alkyl ester monomer (a) is preferably 70 to 98% by mass, more preferably 75 to 94% by mass and furthermore preferably 77 to 92% by mass in relation to the whole monomer components for forming the copolymer (A).

The copolymer (A) includes as a monomer unit the chemical structure derived from the (meth)acrylic acid ester monomer (b) containing an aliphatic ring, and hence the glass transition temperature of the copolymer (A) can be appropriately increased, the obtained adhesive layer is allowed to have an appropriate strength, and at the same time, an appropriate adhesive force to the protrusion of the moth-eye film can also be obtained.

Preferable examples of the (meth)acrylic acid ester monomer (b) include cyclopentyl (meth)acrylate, cyclohexyl (meth)acrylate, cycloheptyl (meth)acrylate and isobornyl (meth)acrylate. Among these, cyclohexyl (meth)acrylate is particularly preferable as the (meth)acrylic acid ester monomer (b). The monomers (b) may be used in combinations of two or more thereof.

From the viewpoint of allowing the obtained adhesive layer to have an appropriate strength, the mixing proportion of the (meth)acrylic acid ester monomer (b) is preferably 1.5 to 25% by mass, more preferably 5 to 21% by mass and furthermore preferably 6 to 20% by mass in relation to the whole monomer components for forming the copolymer (A).

The copolymer (A) includes as a monomer unit the monomer (c) containing a functional group exhibiting reactivity with the cross-linking agent (B), and hence the copolymer (A) can be cross-linked through the cross-linking agent (B), and the cohesive force of the obtained adhesive layer can be improved. Herewith, the adhesive deposit can be effectively reduced.

Preferable examples of the monomer (c) include a carboxyl group-containing monomer, a hydroxyl group-containing monomer and an amino group-containing monomer.

Preferable examples of the carboxyl group-containing monomer include ethylenically unsaturated carboxylic acids such as (meth)acrylic acid, crotonic acid, maleic acid, itaconic acid and citraconic acid. Preferable examples of the hydroxyl group-containing monomer include hydroxyalkyl (meth)acrylates such as 2-hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate and 4-hydroxybutyl (meth)acrylate. Preferable examples of the amino group-containing monomer include monoalkylaminoalkyl (meth)acrylates such as monomethylaminoethyl (meth)acrylate, monoethylaminoethyl (meth)acrylate, monomethylaminopropyl (meth)acrylate and monoethylaminopropyl (meth)acrylate. The monomers (c) may be used in combinations of two or more thereof.

From the viewpoint of the balance between the repeelability and the adhesive force of the obtained adhesive layer, and control of the polymerization (molecular weight distribution), the mixing proportion of the monomer (c) is preferably 0.5 to 5% by mass, more preferably 1 to 4% by mass and furthermore preferably 2 to 3% by mass in relation to the whole monomer components for forming the copolymer (A).

The copolymer (A) may include as the monomer units chemical structures other than the chemical structures derived from the foregoing (a) to (c). Examples of the other components capable of being included in the foregoing monomer components include: aromatic ring-containing (meth)acrylates such as phenyl (meth)acrylate and naphthyl (meth)acrylate; vinyl esters such as vinyl acetate and vinyl propionate; olefins such as ethylene, propylene and isobutylene; halogenated olefins such as vinyl chloride and vinylidene chloride; styrene-based monomers such as styrene and α-methylstyrene; diene-based monomers such as butadiene, isoprene and chloroprene; nitrile-based monomers such as acrylonitrile and methacrylonitrile; and acrylamides such as acrylamide, N-methylacrylamide and N,N-dimethylacrylamide. The proportions of these components in the whole monomer components can be appropriately altered, but are preferably less than 10% by mass in relation to the whole monomer components.

In the present embodiment, the weight-average molecular weight (Mw) of the (meth)acrylic acid ester copolymer (A) is required to be 600,000 or more and less than 1,500,000. When the weight-average molecular weight is less than 600,000, the cohesive force of the adhesive layer becomes insufficient, and when the protection film is peeled off after the laminated body is allowed to stand in various environments for predetermined periods of time, the adhesive deposit on the asperity layer of the antireflection film occurs. On the other hand, when the weight-average molecular weight is 1,500,000 or more, the control of the polymerization becomes insufficient, the molecular weight distribution becomes large, and the proportion of the components having a molecular weight of 100,000 or less is possibly increased. In the case of the living radical polymerization, the cost increase due to the increase of the polymerization time, the adverse factors such as the adverse effects to the environment due to the lowering of the solid content are of concern. From the same viewpoint, the weight-average molecular weight is preferably 800,000 to 1,400,000 and more preferably 1,000,000 to 1,300,000.

The molecular weight distribution (Mw/Mn) of the copolymer (A) is preferably 1.2 to 3.0. The attempt to obtain the copolymer (A) having a molecular weight distribution of less than 1.2 sometimes results in a remarkable decrease of the production efficiency. On the other hand, when the molecular weight distribution exceeds 3.0, in the laminated body, the low molecular weight components of the copolymer (A) sometimes bleeds out from the adhesive layer of the protection film to the asperity layer side of the antireflection film. From the same viewpoint, the molecular weight distribution is preferably 1.5 to 2.5 and more preferably 1.8 to 2.4.

The weight-average molecular weight and the molecular weight distribution can be determined by a GPC (gel permeation chromatography) method. The details are described below.

In the copolymer (A), the area proportion of the components each having a molecular weight of 100,000 or less, obtained by GPC measurement, in relation to the area of the whole of the copolymer (A) is required to be less than 3.0%. The proportion can be derived from the GPC curve. When the proportion is less than 3.0%, the amount of the low molecular weight components of the copolymer (A) in the adhesive layer becomes small, and hence the migration of the low molecular weight components to the asperity layer side of the antireflection film can be effectively reduced. From the same viewpoint, the proportion is preferably 2.5% or less and more preferably 2.2% or less. The smaller the proportion, the more preferable, and hence the proportion may also be 0%. However, in consideration of the factors such as the production efficiency of the copolymer (A), the proportion is preferably 1.0% or more.

The method for obtaining the (meth)acrylic acid ester copolymer (A) is not particularly limited. Examples of such a method include a method in which the (meth)acrylic acid ester copolymer (A) is obtained by purifying a polymer obtained by a usual free radical polymerization method.

However, the living radical polymerization method requires no separate, special purification step and allows the reaction at the active site to be moderate, and hence, for example, the (a) to (c) components are expected to be introduced into the individual copolymers in accordance with the mixing proportions. Herewith, the variation of the constituent units among the individual components constituting the copolymer (A) is small, and the performances of the adhesive layer such as the prevention of the adhesive deposit can be brought out to a maximum extent. Accordingly, the copolymer (A) is particularly preferably a copolymer obtained by living radical polymerization.

As the living radical polymerization method, for example, the following heretofore known methods can be adopted: an atom transfer radical polymerization method (ATRP polymerization method) using as a polymerization control agent an atom transfer radical polymerization agent; a polymerization method (RAFT polymerization method) based on reversible addition-fragmentation chain transfer using a reversible addition-fragmentation chain transfer agent; and a polymerization method using as a polymerization initiator an organotellurium compound. Among these living radical polymerization methods, the method using as a polymerization initiator an organotellurium compound is preferable from the factors such as the controllability of the molecular weight and the feasibility of the polymerization even in an aqueous system. Hereinafter, the method using as a polymerization initiator an organotellurium compound is described.

<Living Radical Polymerization Using Organotellurium Compound>

The (meth)acrylic acid ester copolymer (A) can be produced by polymerizing the mixture of the monomers by using, for example, the living radical polymerization initiator (hereinafter, also referred to as the organotellurium compound I) represented by the following general formula (1):

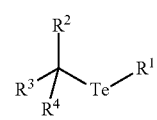

(In the formula, $R^1$ represents an alkyl group having 1 to 8 carbon atoms, an aryl group, a substituted aryl group or an aromatic heterocyclic group; $R^2$ and $R^3$ are the same or different, and each represents a hydrogen atom or an alkyl group having 1 to 8 carbon atoms; $R^4$ represents an aryl group, a substituted aryl group, an aromatic heterocyclic group, an acyl group, an oxycarbonyl group or a cyano group.)

Specifically, the group represented by $R^1$ is as follows.

Examples of the alkyl group having 1 to 8 carbon atoms include: linear, branched and cyclic alkyl groups having 1 to 8 carbon atoms such as a methyl group, an ethyl group, an n-propyl group, an isopropyl group, a cyclopropyl group, an n-butyl group, a sec-butyl group, a tert-butyl group, a cyclobutyl group, an n-pentyl group, an n-hexyl group, an n-heptyl group and an n-octyl group. Examples of preferable alkyl groups include linear and branched alkyl groups having 1 to 4 carbon atoms; more preferable are a methyl group or an ethyl group. Examples of the aryl group include a phenyl group and a naphthyl group. Examples of the substituted aryl group include a phenyl group containing a substituent and a naphthyl group containing a substituent. Examples of the aromatic heterocyclic group include a pyridyl group, a furyl group and a thienyl group. Examples of the substituent in the substituted aryl group include a halogen atom, a hydroxyl group, an alkoxy group, an amino group, a nitro group, a cyano group, a carbonyl-containing group represented by —COR⁵ ($R^5$: an alkyl group having 1 to 8 carbon atoms, an aryl group, an alkoxy group or an aryloxy group), a sulfonyl group, a trifluoromethyl group. Examples of preferable aryl groups include a phenyl group and a trifluoromethyl substituted phenyl group. In the substituted groups, the number of the substituents is preferably 1 or 2, and the substitution position is preferably a para-position or an ortho-position.

Specifically, the groups represented by $R^2$ and $R^3$ are as follows.

Examples of the alkyl group having 1 to 8 carbon atoms include the same alkyl groups as listed above for $R^1$.

Specifically, the group represented by $R^4$ is as follows.

Examples of the aryl group, the substituted aryl group and the aromatic heterocyclic group include the same groups as listed above for $R^1$. Examples of the acyl group include a formyl group, an acetyl group and a benzoyl group. As the oxycarbonyl group, preferable are the groups represented by —COOR⁶ ($R^6$: a hydrogen atom, an alkyl group having 1 to 8 carbon atoms, or an aryl group); examples of the oxycarbonyl group include: a carboxyl group, a methoxycarbonyl group, an ethoxycarbonyl group, a propoxycarbonyl group, an n-butoxycarbonyl group, a sec-butoxycarbonyl group, a tert-butoxycarbonyl group, an n-pentoxycarbonyl group and a phenoxycarbonyl group. Examples of preferable oxycarbonyl groups include a methoxycarbonyl group and an ethoxycarbonyl group.

Preferable examples of the group represented by $R^4$ include an aryl group, a substituted aryl group and an oxycarbonyl group. As the aryl group, preferable is a phenyl group. As the substituted aryl group, preferable is a halogen atom-substituted phenyl group or a trifluoromethyl-substituted phenyl group. In the case where the substituent is a halogen atom, the number of the halogen atoms in the substituted aryl group is preferably 1 to 5. In the case where the substituent is an alkoxy group or a trifluoromethyl group, the number of the substituents in the substituted aryl group is preferably 1 or 2. The substitution position in the case of the substitution with one substituent is preferably a para-position or an ortho-position, and the substitution positions in the case of the substitution with two substituents are preferably meta-positions. As the oxycarbonyl group, preferable is a methoxycarbonyl group or an ethoxycarbonyl group.

As the organotellurium compound I represented by the foregoing general formula (1), preferable is a compound in which $R^1$ represents an alkyl group having 1 to 4 carbon atoms, $R^2$ and $R^3$ are the same or different, and each represents a hydrogen atom or an alkyl group having 1 to 4 carbon atoms, and $R^4$ represents an aryl group, a substituted aryl group or an oxycarbonyl group; more preferable is a compound in which $R^1$ represents an alkyl group having 1 to 4 carbon atoms, $R^2$ and $R^3$ are the same or different, and each represents a hydrogen atom or an alkyl group having 1 to 4 carbon atoms, and $R^4$ represents a phenyl group, a substituted phenyl group, a methoxycarbonyl group or an ethoxycarbonyl group.

Specifically, examples of the organotellurium compound represented by the general formula (1) are as follows.

Examples of the organotellurium compound include: (methyltellanyl-methyl)benzene, (1-methyltellanyl-ethyl)benzene, (2-methyltellanyl-propyl)benzene, 1-chloro-4-(methyltellanyl-methyl)benzene, 1-hydroxy-4-(methyltellanyl-methyl)benzene, 1-methoxy-4-(methyltellanyl-methyl)benzene, 1-amino-4-(methyltellanyl-methyl)benzene, 1-nitro-4-(methyltellanyl-methyl)benzene, 1-cyano-4-(methyltellanyl-methyl)benzene, 1-methylcarbonyl-4-(methyltellanyl-methyl)benzene, 1-phenylcarbonyl-4-(methyltellanyl-methyl)benzene, 1-methoxycarbonyl-4-(methyltellanyl-methyl)benzene, 1-phenoxycarbonyl-4-(methyltellanyl-methyl)benzene, 1-sulfonyl-4-(methyltellanyl-methyl)benzene, 1-trifluoromethyl-4-(methyltellanyl-methyl)benzene, 1-chloro-4-(1-methyltellanyl-ethyl)benzene, 1-hydroxy-4-(1-methyltellanyl-ethyl)benzene, 1-methoxy-4-(1-methyltellanyl-ethyl)benzene, 1-amino-4-(1-methyltellanyl-ethyl)benzene, 1-nitro-4-(1-methyltellanyl-ethyl)benzene, 1-cyano-4-(1-methyltellanyl-ethyl)benzene, 1-methylcarbonyl-4-(1-methyltellanyl-ethyl)benzene, 1-phenylcarbonyl-4-(1-methyltellanyl-ethyl)benzene, 1-methoxycarbonyl-4-(1-methyltellanyl-ethyl)benzene, 1-phenoxycarbonyl-4-(1-methyltellanyl-ethyl)benzene, 1-sulfonyl-4-(1-methyltellanyl-ethyl)benzene, 1-trifluoromethyl-4-(1-methyltellanyl-ethyl)benzene[1-(1-methyltellanyl-ethyl)-4-trifluoromethylbenzene], 1-(1-methyltellanyl-ethyl)-3,5-bis-trifluoromethylbenzene, 1,2,3,4,5-pentafluoro-6-(1-methyltellanyl-ethyl)benzene, 1-chloro-4-(2-methyltellanyl-propyl)benzene, 1-hydroxy-4-(2-methyltellanyl-propyl)benzene, 1-methoxy-4-(2-methyltellanyl-propyl)benzene, 1-amino-4-(2-methyltellanyl-propyl)benzene, 1-nitro-4-(2-methyltellanyl-propyl)benzene, 1-cyano-4-(2-methyltellanyl-propyl)benzene, 1-methylcarbonyl-4-(2-methyltellanyl-propyl)benzene, 1-phenylcarbonyl-4-(2-methyltellanyl-propyl)benzene, 1-methoxycarbonyl-4-(2-methyltellanyl-propyl)benzene, 1-phenoxycarbonyl-4-(2-methyltellanyl-propyl)benzene, 1-sulfonyl-4-(2-methyltellanyl-propyl)benzene, 1-trifluoromethyl-4-(2-methyltellanyl-propyl)benzene, 2-(methyltellanyl-methyl)pyridine, 2-(1-methyltellanyl-ethyl)pyridine, 2-(2-methyltellanyl-propyl)pyridine, 2-methyl-2-methyltellanyl-propanal, 3-methyl-3-methyltellanyl-2-butanone, methyl 2-methyltellanyl-ethanoate, methyl 2-methyltellanyl-propionate, methyl 2-methyltellanyl-2-methylpropionate, ethyl 2-methyltellanyl-ethanate, ethyl 2-methyltellanyl-propionate, ethyl 2-methyltellanyl-2-methylpropionate[ethyl-2-methyl-2-methyltellanyl-propionate], ethyl 2-(n-butyltellanyl)-2-methylpropionate[ethyl-2-methyl-2-n-butyltellanyl-propionate], 2-methyltellanylacetonitrile, 2-methyltellanylpropionitrile, 2-methyl-2-methyltellanyl-propionitrile, (phenyltellanyl-methyl)benzene, (1-phenyltellanyl-ethyl)benzene and (2-phenyltellanyl-propyl)benzene.

In the foregoing examples, the methyltellanyl moiety, the 1-methyltellanyl moiety, and the 2-methyltellanyl moiety may each be substituted with an ethyltellanyl group, a 1-ethyltellanyl group, a 2-ethyltellanyl group, a butyltellanyl group, a 1-butyltellanyl group or a 2-butyltellanyl group.

Among the foregoing organotellurium compounds, preferable are (methyltellanyl-methyl)benzene, (1-methyltellanyl-ethyl)benzene, (2-methyltellanyl-propyl)benzene, 1-chloro-4-(1-methyltellanyl-ethyl)benzene, 1-trifluoromethyl-4-(1-methyltellanyl-ethyl)benzene[1-(1-methyltellanyl-ethyl)-4-trifluoromethylbenzene], methyl 2-methyltellanyl-2-methylpropionate, ethyl 2-methyltellanyl-2-methylpropionate[ethyl-2-methyl-2-methyltellanyl-propionate], ethyl 2-(n-butyltellanyl)-2-methylpropionate [ethyl-2-methyl-2-n-butyltellanyl-propionate], 1-(1-methyltellanyl-ethyl)-3,5-bis-trifluoromethylbenzene, 1,2,3,4,5-pentafluoro-6-(1-methyltellanyl-ethyl)benzene, 2-methyltellanylpropionitrile, 2-methyl-2-methyltellanylpropionitrile, (ethyltellanyl-methyl)benzene, (1-ethyltellanyl-ethyl)benzene, (2-ethyltellanyl-propyl)benzene, methyl 2-ethyltellanyl-2-methylpropionate, ethyl 2-ethyltellanyl-2-methylpropionate, 2-ethyltellanylpropionitrile, 2-methyl-2-ethyltellanylpropionitrile, (n-butyltellanyl-methylbenzene, (1-n-butyltellanyl-ethyl)benzene, (2-n-butyltellanyl-propyl)benzene, methyl 2-n-butyltellanyl-2-methylpropionate, ethyl 2-n-butyltellanyl-2-methylpropionate, 2-n-butyltellanylpropionitrile and 2-methyl-2-n-butyltellanylpropionitrile.

These organotellurium compounds represented by the general formula (1) may be used each alone or in combinations of two or more thereof.

In the polymerization step in the present embodiment, in addition to the organotellurium compound, an azo-based polymerization initiator may be added as a polymerization promoter. The azo-based polymerization initiator is not particularly limited as long as the azo-based polymerization initiator is an initiator used in common radical polymerization; however, examples of the azo-based polymerization initiator include: 2,2'-azobis(isobutyronitrile) (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovalerianic acid) (ACVA), 1,1'-azobis(1-acetoxy-1-phenylethane), 2,2'-azobis(2-methylbutylamide), 2,2'-azobis(4-methoxy-2,4-dimethylvaleronitrile), 2,2'-azobis(2-methylamidinopropane) dihydrochloride, 2,2'-azobis[2-(2-imidazolin-2-yl)propane], 2,2'-azobis[2-methyl-N-(2-hydroxyethyl)propioneamide], 2,2'-azobis(2,4,4-trimethylpentane), 2-cyano-2-propylazoformamide, 2,2'-azobis(N-butyl-2-methylpropioneamide) and 2,2'-azobis(N-cyclohexyl-2-methylpropioneamide).

When the azo-based polymerization initiator is used, the azo-based polymerization initiator is used in an amount of preferably 0.01 to 100 mol, more preferably 0.1 to 100 mol and furthermore preferably 0.1 to 5 mol in relation to 1 mol of the organotellurium compound, a polymerization initiator represented by the foregoing general formula (1).

Specific examples of the method for forming the (meth) acrylic acid ester copolymer (A) by living radical polymerization include the following example.

In a vessel in which the atmosphere is replaced with an inert gas, a mixture including the monomers (a) to (c), the living radical polymerization initiator represented by the general formula (1), and if requested, an azo-based polymerization initiator are mixed together. Examples of the inert gas used in this case include nitrogen, argon and helium. The inert gas is preferably argon or nitrogen, and more preferably nitrogen.

The used amounts of the monomers and the living radical polymerization initiator represented by the general formula (1) may be appropriately regulated according to the molecular weight or the molecular weight distribution of the obtained (meth)acrylic acid ester copolymer (A) (hereinafter, also referred to as the living radical copolymer (A)). The standard of the preferable used amount is the value (the unit of the used amount is the number of moles) obtained by dividing, by the weight-average molecular weight (Mw) of the target copolymer (A), the sum of the values obtained by multiplying the molecular weights of the monomers respectively by the corresponding feed proportions; however, 0.3 to 3 times the value of the used amount are used as the case may be.

The polymerization step in the present embodiment may be performed under solvent-free conditions; however, organic solvent commonly used for radical polymerization may also be used. Examples of the usable solvent include: benzene, toluene, N,N-dimethylformamide (DMF), dimethylsulfoxide (DMSO), acetone, chloroform, carbon tetrachloride, tetrahydrofuran (THF), ethyl acetate and trifluoromethylbenzene. Aqueous solvents can also be used, and examples of such usable aqueous solvents include water, methanol, ethanol, isopropanol, n-butanol, ethyl cellosolve, butyl cellosolve and 1-methoxy-2-propanol. The used amount of the solvent may be appropriately regulated; however, for example, in relation to 1 g of the monomer, the used amount of the solvent is set preferably at 0.01 to 100 ml, more preferably at 0.05 to 10 ml and furthermore preferably at 0.05 to 0.5 ml.

Next, the mixture prepared by the foregoing method is stirred. The reaction temperature and the reaction time may be appropriately regulated according to the molecular weight or the molecular weight distribution of the obtained living radical copolymer (A); however, for example, the mixture is stirred at 60 to 150° C. for 5 to 100 hours. The mixture is preferably stirred at 80 to 120° C. for 10 to 30 hours. The stirring may be performed at normal pressure, or alternatively, either under a pressurized condition or under a reduced pressure condition.

After the completion of the reaction, the solvent used and the residual monomers are removed under reduced pressure by a conventional method, and then the reaction mixture is subjected to the operations such as precipitation followed by filtration, reprecipitation and column separation, and thus the target living radical copolymer (A) is purified if necessary. The reaction processing can be performed by any processing method as long as the target product suffers no disadvantage.

In the living radical polymerization method, the use of the mixture including the monomers to constitute the (meth) acrylic acid ester copolymer (A) enables to obtain the (meth)acrylic acid ester copolymer (A), which is a random copolymer. According to the living radical polymerization method, the random copolymer can be obtained as a copolymer having the same component proportions as in the monomers to be allowed to react, regardless of the types of the monomers.

The living radical polymerization initiator represented by the general formula (1), used in the present embodiment can perform excellent molecular weight control and excellent molecular weight distribution control under mild conditions.

The weight-average molecular weight of the (meth) acrylic acid ester copolymer (A) composed of the living radical copolymer obtained in the present embodiment can be regulated by the reaction time and the amount of the living radical polymerization initiator (organotellurium compound) represented by the general formula (1). Specifically, for the purpose of increasing the molecular weight, the mixing proportion of the organotellurium compound relative to the monomers may be reduced and the polymerization time may be increased; however, this way takes a long time to obtain the copolymer (A) having a large weight-average molecular weight. Accordingly, for the purpose of reducing the polymerization time, the measures including the increase of the polymerization temperature and the addition of the azo-based polymerization initiator are required. However, when the polymerization temperature is too high, or when the addition amount of the azo-based polymerization initiator is too large, the molecular weight distribution of the copolymer (A) is increased, and hence it should be noted that the regulation involving the increase of the molecular weight distribution is required.

Thus, it is possible to obtain the (meth)acrylic acid ester copolymer (A) in which the weight-average molecular weight is 600,000 or more and less than 1,500,000, the molecular weight distribution (ratio Mw/Mn) is less than 3.0, and the area proportion of the low molecular weight components each having a molecular weight of 100,000 or less, obtained by GPC measurement, in relation to the area of the whole of the copolymer (A) is less than 3.0%.

<Cross-Linking Agent (B)>

Next, the cross-linking agent (B), one of the essential components of the adhesive composition is described. Preferable examples of the cross-linking agent (B) include isocyanate-based cross-linking agents, epoxy-based cross-linking agents, aziridine-based cross-linking agents and metal chelate-based cross-linking agents. The cross-linking agent (B) is preferably selected on the basis of the relation with the monomer (c), of the monomer components constituting the copolymer (A), exhibiting reactivity with the cross-linking agent. For example, when the monomer (c) is a hydroxyl group-containing monomer, an isocyanate-based cross-linking agent is preferably used. On the other hand, when the monomer (c) is a carboxyl group-containing monomer or an amino group-containing monomer, an epoxy-based cross-linking agent, an aziridine-based cross-linking agent or a metal chelate-based cross-linking agent is preferably used.

The isocyanate-based cross-linking agents include at least polyisocyanate compounds. Examples of the polyisocyanate compound include: aromatic polyisocyanates such as tolylene diisocyanate, diphenylmethane diisocyanate and xylylene diisocyanate; aliphatic polyisocyanates such as hexamethylene diisocyanate; alicyclic polyisocyanates such as isophorone diisocyanate and hydrogenated diphenylmethane diisocyanate; biuret derivatives of these, isocyanurate derivatives of these, and adducts which are reaction products with low molecular weight active hydrogen containing compounds such as ethylene glycol, propylene glycol, neopentyl glycol, trimethylolpropane and castor oil. In consideration of wettability to the asperity layer of the antireflection film and the durability, isocyanurate derivatives of aliphatic polyisocyanates such as the trimer of hexamethylene diisocyanate are particularly preferable.

Examples of the epoxy-based cross-linking agent include 1,3-bis(N,N'-diglycidylaminomethyl)cyclohexane, N,N,N',N'-tetraglycidyl-m-xylylenediamine, ethylene glycol diglycidyl ether, 1,6-hexanediol diglycidyl ether, trimethylolpropane-diglycidyl ether, diglycidyl aniline and diglycidyl amine.

Examples of the aziridine-based cross-linking agent include diphenylmethane-4,4'-bis(1-aziridinecarboxamide), trimethylolpropane tri-β-aziridinyl propionate, tetramethylolmethane tri-β-aziridinylpropionate, toluene-2,4-bis(1-aziridinecarboxamide), triethylenemelamine, bisisophthaloyl-1-(2-methylaziridine), tris-1-(2-methylaziridine) phosohine and trimethylolpropane tri-β-(2-methylaziridine) propionate.

Examples of the metal chelate-based cross-linking agent include chelate compounds in which metal atoms are aluminum, zirconium, titanium, zinc, iron or tin; however, from the viewpoint of the performances, aluminum chelate compounds are preferable. Examples of the aluminum chelate compound include diisopropoxyaluminum monooleylacetoacetate, monoisopropoxyaluminum bisoleylacetoacetate, monoisopropoxyaluminum monooleate monoethylacetoacetate, diisopropoxyaluminum monolaurylacetoacetate, diisopropoxyaluminum monostearylacetoacetate and diisopropoxyaluminum monoisostearylacetoacetate.

Among these, from the viewpoint of the easiness in handling and the capability of forming a cross-linked structure having appropriate strength and flexibility, an isocyanate-based cross-linking agent is preferably used as the cross-linking agent (B). When an isocyanate-based cross-linking agent is used, a hydroxyl group-containing monomer is preferably used as the monomer (c) constituting the copolymer (A).

In the case of the foregoing combination, for the purpose of extending the pot life (retarding the gelation), a chelating agent such as acetyl acetone and an organotin catalyst such as dibutyltin dilaurate are preferably added as a chelated substance. The chelating agent is preferably used in an amount of 100 to 500 parts by mass in relation to 1 part by mass of the organotin catalyst. The addition amount of the organotin catalyst is preferably 0.01 to 0.1 part by mass in relation to 100 parts by mass of the copolymer (A).

The cross-linking agents may be used each alone or in combinations of two or more thereof.

The mixing amount of the cross-linking agent (B) is preferably set at 0.01 to 15 parts by mass in relation to 100 parts by mass of the copolymer (A). When the mixing amount is less than 0.01 part by mass, the repeelability becomes sometimes insufficient, and when the mixing amount exceeds 15 parts by weight, the adhesive force is sometimes insufficient. The persistence of the unreacted cross-linking agent possibly causes the occurrence of the adhesive deposit. From the same viewpoint, the mixing amount is preferably 0.1 to 10 parts by mass and more preferably 1 to 5 parts by mass.

<Other Components>

To the adhesive composition in the present embodiment, various components can be added in addition to the (meth) acrylic acid ester copolymer (A) and the cross-linking agent (B). Examples of such components include an antioxidant, an antistatic agent, a refractive index adjuster, a light diffusion agent, an ultraviolet absorber, an infrared absorber, a colorant, a reactivity diluting agent and a leveling agent.

Next, the constitution of the protection film 13 in the present embodiment is described.

<On Supporting Film 21>

Examples of the supporting film 21 include, without being particularly limited to: films of polyesters such as polyethylene terephthalate, polybutylene terephthalate and polyethylene naphthalate; a polyethylene film, a polypropylene film, cellofan, a diacetyl cellulose film, a triacetyl cellulose film, an acetylcellulose butyrate film, a polyvinyl chloride film, a polyvinylidene chloride film, a polyvinyl alcohol film, an ethylene-vinyl acetate copolymer film, a polystyrene film, a polycarbonate film, a polymethylpentene film, a polysulfone film, a polyether ether ketone film, a polyether sulfone film, a polyether imide film, a polyimide film, a fluororesin film, a polyamide film, an acrylic resin film, a norbornene-based resin film and a cycloolefin resin film. The supporting film 21 is preferably transparent from the viewpoint of performing inspection work under the condition that the protection film 13 is bonded, or required is the use, according to the preference of the user, in which the visual recognition through the protection film 13 that remains bonded.

The thickness of the supporting film 21 is not particularly limited and is appropriately selected; however, the thickness of the supporting film 21 is preferably 10 to 250 μm and more preferably falls within a range from 30 to 200 μm. The supporting film 21 may be subjected to surface treatment, if requested, based on the method such as an oxidation method or an asperity formation method on one side or on both sides thereof, for the purpose of improving the adhesiveness with the layer to be disposed on surface thereof. Examples of the oxidation method include corona discharge treatment, plasma treatment, chromic acid treatment (wet type), flame treatment, hot air treatment and ozone•ultraviolet irradiation treatment. Examples of the asperity formation method include a sandblast method and solvent treatment. These surface treatment methods are appropriately selected according to the type of the supporting film; however, from the aspects of effects and operability, the corona discharge treatment method is preferably used. Alternatively, a supporting film subjected to primer treatment on one side or both sides thereof may also be used.

<Preparation of Protection Film 13>

The adhesive composition is prepared by sequentially adding under stirring the foregoing various components. The adhesive composition can be diluted, if necessary, by using a diluting solvent. Herewith, the achievement of the uniformization of the adhesive composition and the regulation of the viscosity required for coating are facilitated.

Preferable examples of the diluting solvent include: aliphatic hydrocarbons such as hexane and heptane; alicyclic compounds such as cyclohexane and cycloheptane; aromatic hydrocarbons such as toluene and xylene; halogenated hydrocarbons such as methylene chloride and ethylene chloride; alcohols such as methanol, ethanol, propanol and butanol; ketones such as acetone, methyl ethyl ketone, 2-pentanone, isophorone and cyclohexanone; esters such as ethyl acetate and butyl acetate; cellosolve-based solvents such as ethyl cellosolve; and glycol ether-based solvents such as propylene glycol monomethyl ether.

The used amount of the diluting solvent is not particularly limited; however, when the diluting solvent is used, it is preferable to dilute so as for the concentration of the adhesive composition to be 10 to 60% of the whole of the diluted adhesive composition solution.

The obtained adhesive composition or the diluted solution of the adhesive composition is applied onto the supporting film 21, and dried and cross-linked if necessary, to form the adhesive layer 22.

As the method for applying the adhesive composition or the diluted solution of the adhesive composition, there can be used a method in which the adhesive composition or the diluted solution of the adhesive composition is applied to a base material so as for the thickness of the adhesive layer 22 to be predetermined value by using a heretofore known method such as a knife coating method, a roll coating method, a bar coating method, a blade coating method, a die coating method or a gravure coating method, and then dried.

The thickness of the adhesive layer 22 is preferably 2 to 30 μm and more preferably 5 to 15 μm. The foregoing drying is preferably performed at 60 to 120° C. for about 10 seconds to about 10 minutes for the purpose of volatilizing the diluting solvent used and allowing the cross-linking reaction to proceed.

The adhesive layer 22 thus obtained of the protection film 13 preferably undergoes the protection of the exposed surface of the adhesive layer with a release film and followed by an aging treatment if necessary. The aging treatment preferably allows the adhesive layer to stand at 20 to 60° C. for 1 to 2 weeks. Herewith, the cross-linking reaction between the copolymer (A) and the cross-linking agent (B) in the adhesive layer 22 is completed, and thus, the adhesive layer 22 stabilized in performances can be obtained. The release film can be obtained by applying a heretofore known silicone-based, olefin-based, fluorine-based or alkyd-based release agent onto the various films listed as examples for the supporting film 21.

<Preparation of Laminated Body>

According to the above-described method, the antireflection film 12 including the protrusions 12a in which the width between the adjacent tops of the protrusions is equal to or less than the visible light wavelength is produced.

On the other hand, the protection film 13 obtained by the foregoing step is, after the aging treatment, bonded to the antireflection film 12 in such a way that the adhesive layer 22 and the protrusion side of the antireflection film 12 are brought into contact with each other, wherein in the case where a release film is laminated on the adhesive layer 22, the release film is removed before the bonding, and in the case where no release film is laminated, the adhesive layer 22 is bonded as it is to the antireflection film 12.

Subsequently, the protection film 13 and the antireflection film 12 are pressure bonded, for example, by using a commercially available laminator, and thus a laminated body 10 constituted with the protection film 13 and the antireflection film 12 can be obtained. The pressure bonding method is not particularly limited; however, for example, the pressure bonding can be performed at a rate of 0.1 to 10 m/min under a pressurized condition of 0.01 to 1 MPa.

Hereinafter, the present invention is further specifically described with reference to Examples, Comparative Examples and Reference Examples; however, the present invention is not limited by following Examples.

<Derivation of Weight-Average Molecular Weight (Mw) and Molecular Weight Distribution (Mw/Mn)>

By a gel permeation chromatography (GPC) method, the weight-average molecular weight Mw, the number-average molecular weight Mn and the content (area %) of the low molecular weight components each having a molecular weight of 100,000 or less relative to polystyrene standards were determined under the following conditions.

Measurement apparatus: Measurement was performed with the high performance GPC apparatus "HLC-8120GPC" (manufactured by TOSOH Corp.) in which the high performance columns "TSK gurd column $H_{XL}$-H", "TSK Gel GMH$_{XL}$" and "TSK Gel G2000 H$_{XL}$" (all the foregoing, manufactured by TOSOH Corp.) were connected in the stated order.

Column temperature: 40° C., liquid feed rate: 1.0 mL/min, detector: a differential refractometer <Measurement of Adhesive Force>

For the laminated body 10 obtained in each of following Examples, Comparative Examples and Reference Examples, the adhesive force (mN/25 mm) between the moth-eye film (antireflection film) 12 and the protection film 13 was measured according to JIS Z0237:2009 except that the protection film 13 was peeled off at a peeling rate of 0.3 m/min or 10 m/min in the 180° direction. The results thus obtained are shown in Table 2 presented below. The adhesive force at the peeling rate of 0.3 m/min is preferably 40 to 150 mN/25 mm. The adhesive force at the peeling rate of 10 m/min is preferably 40 to 1000 mN/25 mm.

<Evaluation of Adhesive Residue>

Figure 24:
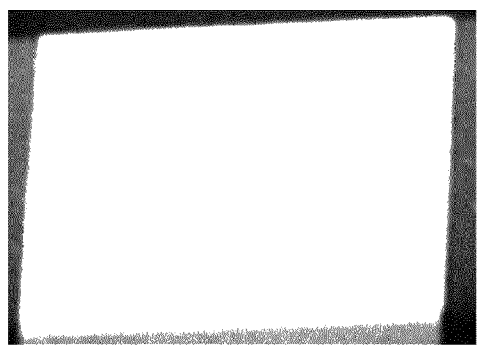
FIG. 24 shows the photographs of samples different in reflectance, used as the evaluation standards of adhesive residue.
Figure 24:
Figure 24:
Figure 24:
Figure 24:
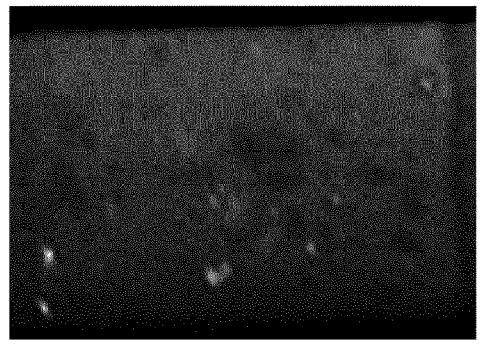
Figure 24:
Figure 24:
Figure 24:

For the laminated body 10 obtained in each of following Examples, Comparative Examples and Reference Examples, the backside on the moth-eye film 12 side (the surface opposite to the side on which protrusions were formed) was bonded with an adhesive to a flat black acrylic plate (Sumipex 960, manufactured by Sumitomo Chemical Co., Ltd.). Next, these laminated bodies 10 were subjected to the following different endurance conditions for 120 hours, and were subsequently allowed to stand still at 23° C. and a relative humidity of 50% for 24 hours. Successively, the protection films of the laminated bodies were peeled off, and the protrusion sides of the exposed moth-eye films 12 were irradiated with a fluorescent lamp located above the protrusion sides at a distance of 30 cm, and the state of reflection (variation of hue) of each of the protrusion sides was observed. On the basis of the standards of the photographs shown in FIG. 24, the state of reflection was evaluated with the following four grades ⊚, ○, Δ and x. FIG. 24 shows the photographs of samples different in reflectance, used as the evaluation standards of adhesive residue. The results thus obtained are shown in Table 2 presented below. In Table 2, ⊚ represents the case where no increase of the reflected light amount is sensed at all and no adhesive residue remains at all; ○ represents the case where almost no increase of the reflected light amount is sensed and almost no adhesive residue remains; Δ represents the case where a slight increase of the reflected light amount is sensed and the adhesive residue remains, and hence the state of reflection cannot be said to be satisfactory; and x represents the case where an increase of the reflected light amount is sensed and the adhesive residue remains, and hence the laminated body is classified as a defective product.

As shown in Table 2, the endurance conditions were the following three conditions.

1) 23° C. and relative humidity (RH) of 50%
2) 80° C., under dry condition
3) 60° C. and relative humidity (RH) of 95%

TABLE 2

| | Mixing | | | | | | | Properties | | | | |
|---|---|---|---|---|---|---|---|---|---|---|---|---|
| | Acrylic acid ester copolymer (A) | | | | | | | Adhesive force | | Adhesive residue | | |
| | | Poly- | | | Mw | Cross-linking | | | | 23° C., | | 60° C., |
| | | merization | | Mw/ | <100k | agent (B) | | 0.3 m/ | 10 m/ | 50% | 80° C. | 95% |
| | Composition | method | Mw | Mn | (%) | name | phr. | min | min | RH | dry | RH |
| Example 1 | BA/CHA/4HBA = 77/20/3 | LRP | 1,000,000 | 2.06 | 1.95 | Colonate HXR | 3.0 | 100 | 700 | ◎ | ◎ | ◎ |
| Example 2 | BA/CHA/4HBA = 77/20/3 | LRP | 1,300,000 | 2.35 | 1.91 | Colonate HXR | 3.0 | 95 | 675 | ◎ | ◎ | ◎ |
| Example 3 | BA/CHA/4HBA = 87/10/3 | LRP | 1,000,000 | 2.06 | 2.01 | Colonate HXR | 3.0 | 90 | 600 | ◎ | ◎ | ◎ |
| Example 4 | BA/CHA/4HBA = 92/5/3 | LRP | 1,000,000 | 2.06 | 2.11 | Colonate HXR | 3.0 | 85 | 600 | ◎ | ◎ | ○ |
| Comparative Example 1 | 2EHA/4HBA = 95/5 | FRP | 490,000 | 8.01 | 22.69 | Colonate HXR | 3.0 | 60 | 550 | X | X | X |
| Comparative Example 2 | BA/2EHA/4HBA = 20/77.5/2.5 | FRP | 550,000 | 7.05 | 18.56 | Colonate HXR | 3.0 | 65 | 600 | X | X | X |
| Comparative Example 3 | BA/4HBA = 99/1 | FRP | 1,800,000 | 3.65 | 5.61 | Colonate HXR | 1.0 | 350 | 3800 | Δ | X | X |
| Comparative Example 4 | BA/CHA = 80/20 | LRP | 930,000 | 2.27 | 2.65 | Colonate HXR | 3.0 | cf | cf | ○ | Δ | Δ |
| Comparative Example 5 | BA/CHA/4HBA = 47/50/3 | LRP | 980,000 | 2.37 | 2.85 | Colonate HXR | 3.0 | 130 | 210 (zipping) | ○ | ○ | Δ |
| Comparative Example 6 | BA/CHA/4HBA = 77/20/3 | LRP | 930,000 | 2.27 | 3.17 | Colonate HXR | 3.0 | 90 | 650 | ○ | Δ | Δ |
| Comparative Example 7 | BA/CHA/4HBA = 75/20/5 | LRP | 530,000 | 1.85 | 3.25 | Colonate HXR | 3.0 | 70 | 600 | ○ | Δ | Δ |
| Reference Example 1 | BA/2EHA/4HBA = 20/77.5/2.5 | FRP | 550,000 | 7.05 | 18.56 | Colonate HXR | 3.0 | 80 | 700 | ◎ | — | — |
| Reference Example 2 | BA/2EHA/4HBA = 20/77.5/2.5 | FRP | 550,000 | 7.05 | 18.56 | Colonate HXR | 3.0 | 80 | 700 | ◎ | — | — |
| Reference Example 3 | BA/2EHA/4HBA = 20/77.5/2.5 | FRP | 550,000 | 7.05 | 18.56 | Colonate HXR | 3.0 | 80 | 700 | ◎ | — | — |
| Reference Example 4 | BA/2EHA/4HBA = 20/77.5/2.5 | FRP | 550,000 | 7.05 | 18.56 | Colonate HXR | 3.0 | 80 | 700 | ◎ | — | — |

Example 1

(1) Production of (Meth)acrylic Acid Ester Copolymer (A) Composed of Random Copolymer by Living Radical Polymerization In 50 ml of tetrahydrofuran (THF), 6.38 g (50 mmol) of metal tellurium (trade name: Tellurium (−40 mesh), manufactured by Aldrich Corp.) was suspended, and to the resulting suspension, 34.4 ml (55 mmol) of n-butyl lithium (1.6 mol/L hexane solution, manufactured by Aldrich Corp.) was slowly added dropwise at room temperature. The reaction solution after the dropwise addition was stirred until the metal tellurium completely disappeared. To the reaction solution after the stirring, 10.7 g (55 mmol) of ethyl-2-bromo-isobutyrate was added at room temperature and the reaction solution was stirred further for 2 hours. After the completion of the reaction, the solvent was concentrated under reduced pressure, successively the reaction solution was distilled under reduced pressure, and 8.98 g (yield: 59.5%) of ethyl-2-methyl-2-n-butyltellanyl-propionate as a yellow oil-like product, was obtained.

Butyl acrylate (BA) as the monomer (a), cyclohexyl acrylate (CHA) as the monomer (b) and 4-hydroxybutyl acrylate (4HBA) as the monomer (c) (all the foregoing, manufactured by Tokyo Chemical Industry Co., Ltd.) were used in a mass ratio of 77:20:3, the below-described living radical polymerization was performed, and thus a solution of (meth)acrylic acid ester copolymer (A) composed of a BA/CHA/4HBA random copolymer was produced. The properties of the copolymer are shown in Table 2 presented above.

<Living Radical Polymerization>

In a glovebox in which the atmosphere was replaced with argon, 68.5 μL of ethyl-2-methyl-2-n-butyltellanyl-propionate produced by the foregoing method, 110 g of butyl acrylate (same as above), 28.5 g of cyclohexyl acrylate (same as above), 4.3 g of 4-hydroxybutyl acrylate (same as above), and 4.6 mg of 2,2'-azobis(isobutyronitrile) (AIBN) (manufactured by Aldrich Corp.) were allowed to react with each other at 60° C. for 20 hours.

After the completion of the reaction, the reaction vessel was taken out from the glovebox, the taken-out reaction mixture was dissolved in 500 ml of ethyl acetate, the resulting solution of (meth)acrylic acid ester copolymer was allowed to pass through a column prepared by using activated alumina (manufactured by Wako Pure Chemical Industries, Ltd.). Subsequently, the solid content of the solution of (meth)acrylic acid ester copolymer (A) was adjusted to 16% by mass by adding toluene.

The final product was subjected to GPC measurement and was found to have a weight-average molecular weight Mw of 1,000,000 and a molecular weight distribution (Mw/Mn) of 2.06. Also, from the GPC chart, the area proportion of the components each having a molecular weight of 100,000 or less in relation to the area of the whole was found to be 1.95%.

(2) Preparation of Adhesive Composition

A solution of the adhesive composition having a solid content concentration of 14% by mass was prepared by dissolving, in methyl ethyl ketone as the solvent, 100 parts by mass (solid content) of the (meth)acrylic acid ester copolymer (A) composed of a random copolymer, produced in the foregoing (1), 3.0 parts by mass of the cross-linking agent (B), namely, an isocyanurate-type HDI (trade name: Colonate HXR, manufactured by Nippon Polyurethane Industry Co., Ltd., solid content: 100%), 5.0 parts by mass of acetyl acetone and 0.025 part by mass of dibutyltin dilaurate.

Here, the mixing ratio between the components included in the adhesive composition is as shown in Table 2 presented above. The details such as the abbreviations presented in Table 2 are as follows.
  (i) Acrylic Acid Ester Copolymer (A)
  BA: Butyl acrylate
  CHA: Cyclohexyl acrylate
  4-HBA: 4-Hydroxybutyl acrylate
  2EHA: 2-Ethylhexyl acrylate
  (ii) Cross-Linking Agent (B)
  Isocyanate-based cross-linking agent
  Colonate HXR: Trimer (isocyanurate derivative) of hexamethylene diisocyanate (trade name: Colonate HXR, manufactured by Nippon Polyurethane Industry Co., Ltd.)
  (iii) Polymerization Method
  LRP: Living radical polymerization
  FRP: Free radical polymerization (3) Preparation of Protection Film By using a knife-type coating machine, the adhesive composition obtained in the foregoing (2) was applied to one side of a 38 μm-thick antistatic stain-proof polyethylene terephthalate film (trade name: PET38SLD52, manufactured by TORAY Industries, Inc.) as the supporting film 21, so as for the dry thickness to be 5 μm, and then heat dried at 90° C. for 1 minute to form the adhesive layer 22.

Next, a 38 μm-thick release film (trade name: SP-PET381031, manufactured by Lintec Corp.) was bonded as a release film so as for the release treated surface of the release film to be bonded to the exposed side of the adhesive layer 22 obtained as described above. Subsequently, the resulting laminate was subjected to an aging treatment allowing the laminate to stand still for 1 week under the conditions of a temperature of 23° C. and a relative humidity of 50%, and thus the protection film 13 was obtained.

(4) Preparation of Laminated Body 10

A moth-eye film (antireflection film) 12 made of an acrylic-based resin, having a distance between the adjacent protrusions of 150 to 200 nm and the aspect ratio of the protrusion of about 1.5 was prepared.

As the moth-eye film 12, a moth-eye film (antireflection film) 12 made of an acrylic-based resin, having a distance between the adjacent protrusions of 150 to 200 nm and the aspect ratio of the protrusion of about 1.1 was prepared. First, a glass substrate was prepared, aluminum (Al) to be a material for a mold was deposited as a film on the glass substrate by a sputtering method, and a mold for the moth-eye molding was fabricated by using the conditions of the mold 3 shown in Table 1 presented above. Next, a solution of a 2P (photopolymerizable) resin having translucency was placed dropwise on the mold, and the mold and a TAC film were bonded to each other through the 2P resin by using a roller while attention was being paid not to incorporate bubbles. Subsequently, the laminate of the mold and the TAC film was irradiated with 2 J/cm$^2$ of ultraviolet light from the side of the TAC film to cure the 2P resin layer, and the mold was from the laminate film of the cured 2P resin and the TAC film to prepare a moth-eye film (antireflection film). The prepared moth-eye film was bonded with an optical adhesive to a black acrylic plate, the reflectance of the moth-eye film was measured, and the reflectance at an incident angle of 5° was found to be 0.1% or less; thus, the moth-eye film was revealed to have an extremely excellent antireflection performance.

On the other hand, the release film was removed from the protection film 13 for which the aging treatment had been completed in the foregoing step. Subsequently, the protection film 13 was superposed on the moth-eye film so as for the exposed adhesive layer 22 to be brought into contact with the side on which the protrusions of the moth-eye film 12 were formed.

Further, under the condition that the protection film 13 and the moth-eye film 12 were superposed on each other, the protection film 13 and the moth-eye film 12 were pressure bonded to each other with a laminator at 0.1 MPa at a rate of 1 m/min, and thus a laminated body 10 was prepared. The adhesive force and the evaluation results of the occurrence/non-occurrence of the adhesive residue (adhesive deposit) of the laminated body 10 were as shown in Table 2 presented above.

Examples 2 to 4 and Comparative Examples 4 to 7

(1) Production of (Meth)Acrylic Acid Ester Copolymers (A) Composed of Random Copolymer by Living Radical Polymerization In each of Examples 2 to 4 and Comparative Examples 4 to 7, a solution of the (meth)acrylic acid ester copolymer (A) was produced by performing living radical polymerization under the same conditions as in Example 1 except that the types and the proportions of the monomers used were as shown in Table 2 presented above, and the addition amounts of ethyl-2-methyl-2-n-butyltellanyl-propionate and AIBN and the polymerization time were regulated. The properties of each of the copolymers thus obtained are shown in Table 2 presented above.

(2) Preparation of Adhesive Compositions

In each of Examples 2 to 4 and Comparative Examples 4 to 7, 100 parts by mass (solid content) of the (meth)acrylic acid ester copolymers (A) produced in the foregoing (1), and the cross-linking agent of the type and amount shown in Table 2 presented above, 5.0 parts by mass of acetyl acetone and 0.025 part by mass of dibutyltin dilaurate were dissolved in methyl ethyl ketone as the solvent, and thus, an adhesive composition solution having the same solid content concentration as in Example 1 was prepared.

(3) Preparation of Protection Films

Protection films were obtained in the same manner as in Example 1 except that the adhesive composition solutions obtained in the foregoing (2) were used.

(4) Preparation of Laminated Bodies

Laminated bodies were prepared in the same manner as in Example 1 except that the protection films obtained in the foregoing (3) were used. The adhesive force and the evaluation results of the occurrence/non-occurrence of the adhesive residue (adhesive deposit) of each of the laminated bodies were as shown in Table 2 presented above.

Comparative Example 1

(1) Production of (Meth)Acrylic Acid Ester Copolymer by Free Radical Polymerization 2-Ethylhexyl acrylate (same as above) and 4-hydroxybutyl acrylate (same as above) were used as the monomers in a mass ratio of 95:5, the below-described free radical polymerization was performed, and thus a solution of a 2EHA/4HBA, (meth)acrylic acid ester copolymer was produced. The properties of the copolymer are shown in Table 2 presented above.

<Free Radical Polymerization>

In a reaction apparatus equipped with a stirrer, a thermometer, a reflux condenser and a nitrogen introduction tube, nitrogen gas was enclosed, and then 90 parts by mass of ethyl acetate, 95 parts by mass of 2-ethylhexyl acrylate, 5 parts by mass of 4-hydroxybutyl acrylate and 0.2 part by mass of a polymerization initiator, 2,2'-azobis(isobutyronitrile) (AIBN) were placed, and allowed to react with each other under stirring at the reflux temperature of ethyl acetate for 7 hours. After the completion of the reaction, the reaction mixture was diluted with toluene, and thus a solution of the (meth)acrylic acid ester copolymer having a solid content of 40% by mass was obtained.

(2) Preparation of Adhesive Composition

A solution of the adhesive composition was prepared by using the same method as in Example 1 except that the solution of the (meth)acrylic acid ester copolymer obtained in the foregoing (1) was used and the solid content concentration of the obtained adhesive composition was set at 30% by mass.

(3) Preparation of Protection Film

A protection film was obtained in the same manner as in Example 1 except that the solution of the adhesive composition prepared in the foregoing (2) was used, and the solution of the adhesive composition was applied so as for the dry thickness of the adhesive layer 22 to be 20 µm and then dried.

(4) Preparation of Laminated Body

A laminated body was obtained by using the same method as in Example 1 except that the protection film obtained in the foregoing (3) was used. The properties of the laminated body are shown in Table 2 presented above.

Comparative Examples 2 and 3

(1) Production of (Meth)Acrylic Acid Ester Copolymer by Free Radical Polymerization In each of Comparative Examples 2 and 3, a (meth)acrylic acid ester copolymer was produced by the same free radical polymerization as in Comparative Example 1 except that the types and the proportions of the monomers used were as shown in Table 2 presented above, and the addition amount of AIBN and the polymerization time were regulated. The properties of each of the copolymers are shown in Table 2 presented above.

Next, in the same manner as in Comparative Example 1, the solutions of the adhesive compositions were prepared, and protection films and laminated bodies were prepared. The properties of each of the laminated bodies are shown in Table 2 presented above.

Reference Examples 1 to 4

In each of Reference Examples 1 to 4, a laminated body was prepared in the same manner as in Comparative Example 2 except that the protection film obtained in Comparative Example 2 was used, and the moth-eye film 12 was altered to the film shown in Table 3 presented below. In other words, the protection film itself in each of Reference Examples 1 to 4 is the same as the protection film used in Comparative Example 2. The properties of each of the laminated bodies are shown in Table 2 presented above.

TABLE 3

|  | Reference Example 1 | Reference Example 2 | Reference Example 3 | Reference Example 4 |
| --- | --- | --- | --- | --- |
| Type of surface treatment | No treatment | Low reflection treatment | AG treatment | Low reflection, AG treatment |
| Asperity structure | None | None | Asperities of the order of micrometers | Asperities of the order of micrometers |
| Low reflection treatment | None (TAC) | Interference thin film (Clear LR) | None (AG only) | Interference thin film (AGLR) |
| Storage test | Storage test at normal temperature | Storage test at normal temperature | Storage test at normal temperature | Storage test at normal temperature |

Hereinafter, the individual evaluation results are summarized.

As shown in Table 2 presented above, for Examples 1 to 4, satisfactory results were obtained both for the adhesive force and for the occurrence/non-occurrence of the adhesive residue (adhesive deposit). Examples 1 to 3 in which the mixing amount of cyclohexyl acrylate in the acrylic acid ester copolymer (A) was increased to a predetermined amount gave such satisfactory results that no adhesive residue was left even after the laminated bodies were allowed to stand still in an environment of a temperature of 60° C. and a relative humidity of 95% environment for 120 hours.

On the other hand, Comparative Examples 1 to 3, 6 and 7 in each of which in the acrylic acid ester copolymer, the area proportion of the components each having a molecular weight of 100,000 or less derived on the basis of the GPC curve is 3.0% or more in relation to the whole of the acrylic acid ester copolymer gave no satisfactory results in the adhesive residue test. Comparative Example 4 did not include the structure derived from the monomer (c) as the monomer units constituting the acrylic acid ester copolymer, and hence caused, in the measurement of the adhesive force, cohesive failure in the adhesive layer. Comparative Example 5 was too large in the mixing proportion of the monomer (b) in the synthesis of the acrylic acid ester copolymer, and hence underwent the occurrence of zipping in the measurement of the adhesive force at the peeling rate of 10 m/min. The occurrence of zipping possibly damages the protrusions of the moth-eye film through the vibration due to the zipping, and hence the zipping is unfavorable for the laminated body. Comparative Example 5 also gave poorer results as compared to Examples in the verification test of the adhesive residue. In Comparative Example 7, in addition to the result that the area proportion of the components each having a molecular weight of 100,000 or less derived on the basis of the GPC curve is 3.0% or more, the weight-average molecular weight (Mw) of less than 600,000 is probably a cause for the degradation of the adhesive residue.

As shown in Reference Examples 1 to 4, in the laminated bodies in which the protection film of Comparative Example 2 which was unable to meet the required performances in the verification test of the adhesive residue was applied to various conventional antireflection films but not to the moth-eye films, the adhesive residue was out of question. In other words, it has been shown that only in such a protection film that has the features of the protection film according to the present invention, satisfactory properties can be exhibited in the laminated body with the moth-eye film.

REFERENCE SIGNS LIST

10: Laminated Body
11: Base material
12: Moth-eye film (antireflection film)
12a: Protrusion
12b: Underlying portion
12c: mound
12x: Residual resin film layer
12y: Film base material
12z: Adhesive layer
13: Protection film
14: Recess
21: Supporting film
22: Adhesive layer
23: Adhesive agent (adhesive residue and adhesive deposit)

The invention claimed is:

1. A laminated body, comprising:
an antireflection film; and
a protection film bonded onto the antireflection film,
wherein the surface of the antireflection film includes a plurality of protrusions wherein the width between the tops of adjacent protrusions is equal to or less than the visible light wavelength;
the protection film includes a supporting film and an adhesive layer in contact with the antireflection film;
the adhesive layer is a layer constituted with a material formed by cross-linking, with a cross-linking agent (B), a (meth)acrylic acid ester copolymer (A);
the weight-average molecular weight of the (meth)acrylic acid ester copolymer (A) is 600,000 or more and less than 1,500,000;
the (meth)acrylic acid ester copolymer (A) is a copolymer formed by polymerizing monomer components including, in relation to the total amount of the monomer components set at 100% by mass, 70 to 98% by mass of a (meth)acrylic acid alkyl ester monomer (a) including a noncyclic alkyl group containing 4 to 9 carbon atoms, 1.5 to 25% by mass of a (meth)acrylic acid ester monomer (b) containing an aliphatic ring, and 0.5 to 5% by mass of a (meth)acrylic-based monomer (c) containing a functional group exhibiting reactivity with the cross-linking agent (B); and
the area proportion of the components each having a molecular weight of 100,000 or less, obtained by gel permeation chromatography measurement, in relation to the area of the whole of the (meth)acrylic acid ester copolymer (A) set at 100%, is less than 3.0%, wherein the mixing amount of the cross-linking agent (B) in relation to 100 parts by mass of the (meth)acrylic acid ester copolymer (A) is 1 to 5 parts by mass.

2. The laminated body according to claim 1, wherein the cross-linking agent (B) is an isocyanate-based cross-linking agent.

3. The laminated body according to claim 2, wherein the (meth)acrylic-based monomer (c) is a hydroxyl group-containing monomer.

4. The laminated body according to claim 3, wherein the hydroxyl group-containing monomer is a hydroxyalkyl (meth)acrylate.

5. The laminated body according to claim 1, wherein the molecular weight distribution of the (meth)acrylic acid ester copolymer (A) is 1.2 to 3.0.

6. The laminated body according to claim 1, wherein the area proportion of the components each having a molecular weight of 100,000 or less, obtained by gel permeation chromatography measurement, in relation to the area of the whole of the (meth)acrylic acid ester copolymer (A) set at 100%, is 1.0% or more.

7. The laminated body according to claim 1, wherein the mixing amount of the cross-linking agent (B) in relation to 100 parts by mass of the (meth)acrylic acid ester copolymer (A) is 0.01 to 15 parts by mass.

8. The laminated body according to claim 1, wherein the (meth)acrylic acid alkyl ester monomer (a) is butyl acrylate.

9. The laminated body according to claim 1, wherein the (meth)acrylic acid ester monomer (b) containing the aliphatic ring is cyclohexyl (meth)acrylate.

10. The laminated body according to claim 1, wherein the gaps between the plurality of protrusions of the antireflection film each include a shape sharpened toward the inside of the antireflection film.

11. The laminated body according to claim 1, wherein the thickness of the adhesive layer is 2 to 15 μm.

12. The laminated body according to claim 1, wherein the adhesive force between the antireflection film and the protection film at the peeling rate of 0.3 m/min is 40 to 150 mN/25 mm.

13. The laminated body according to claim 1, wherein the weight-average molecular weight of the (meth)acrylic acid ester copolymer (A) is 1,000,000 or more and less than 1,500,000, and the mixing amount of the (meth)acrylic-based monomer (c) in relation to 100% by mass of the total amount of the monomer components of the (meth)acrylic acid ester copolymer (A) is 0.5 to 3% by mass.

14. The laminated body according to claim 1, wherein the weight-average molecular weight of the (meth)acrylic acid ester copolymer (A) is 1,000,000 or more and less than 1,500,000, and the mixing amount of the (meth)acrylic acid alkyl ester monomer (a) in relation to 100% by mass of the total amount of the monomer components of the (meth)acrylic acid ester copolymer (A) is 77 to 98% by mass.

15. The laminated body according to claim 1, wherein the thickness of the adhesive layer is less than 10 μm.

16. The laminated body according to claim 1, wherein the adhesive force between the antireflection film and the protection film at the peeling rate of 0.3 m/min is 85 to 150 mN/25 mm.

17. The laminated body according to claim 1, wherein the surface of the antireflection film has a contact angle with water of 15° or less.

18. The laminated body according to claim 1, wherein
the adhesive force between the antireflection film and the protection film at the peeling rate of 0.3 m/min is 40 to 150 mN/25 mm,
the weight-average molecular weight of the (meth)acrylic acid ester copolymer (A) is 1,000,000 or more and less than 1,500,000,
the mixing amount of the (meth)acrylic acid alkyl ester monomer (a) in relation to 100% by mass of the total amount of the monomer components of the (meth) acrylic acid ester copolymer (A) is 77 to 98% by mass, and
the mixing amount of the (meth)acrylic-based monomer (c) in relation to 100% by mass of the total amount of the monomer components of the (meth)acrylic acid ester copolymer (A) is 0.5 to 3% by mass.

19. A laminated body, comprising:
an antireflection film; and
a protection film bonded onto the antireflection film,
wherein the surface of the antireflection film includes a plurality of protrusions wherein the width between the tops of adjacent protrusions is equal to or less than the visible light wavelength;
the protection film includes a supporting film and an adhesive layer in contact with the antireflection film;
the adhesive layer is a layer constituted with a material formed by cross-linking, with a cross-linking agent (B), a (meth)acrylic acid ester copolymer (A);
the weight-average molecular weight of the (meth)acrylic acid ester copolymer (A) is 1,000,000 or more and less than 1,300,000;
the (meth)acrylic acid ester copolymer (A) is a copolymer formed by polymerizing monomer components including, in relation to the total amount of the monomer components set at 100% by mass, 70 to 98% by mass of a (meth)acrylic acid alkyl ester monomer (a) including a noncyclic alkyl group containing 4 to 9 carbon atoms, 1.5 to 25% by mass of a (meth)acrylic acid ester monomer (b) containing an aliphatic ring, and 0.5 to 5% by mass of a (meth)acrylic-based monomer (c) containing a functional group exhibiting reactivity with the cross-linking agent (B); and
the area proportion of the components each having a molecular weight of 100,000 or less, obtained by gel permeation chromatography measurement, in relation to the area of the whole of the (meth)acrylic acid ester copolymer (A) set at 100%, is less than 3.0%.

* * * * *